US009609696B2

(12) United States Patent
Kataoka et al.

(10) Patent No.: US 9,609,696 B2
(45) Date of Patent: Mar. 28, 2017

(54) COOKING DEVICE

(75) Inventors: Akira Kataoka, Hyogo (JP); Kazunori Takechi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1024 days.

(21) Appl. No.: 12/738,656

(22) PCT Filed: Oct. 22, 2008

(86) PCT No.: PCT/JP2008/002985

§ 371 (c)(1),
(2), (4) Date: Apr. 19, 2010

(87) PCT Pub. No.: WO2009/054125

PCT Pub. Date: Apr. 30, 2009

(65) Prior Publication Data

US 2010/0206178 A1 Aug. 19, 2010

(30) Foreign Application Priority Data

Oct. 22, 2007 (JP) ................................ 2007-273391

(51) Int. Cl.
*A47J 27/62* (2006.01)
*H05B 6/06* (2006.01)

(52) U.S. Cl.
CPC .................................. *H05B 6/062* (2013.01)

(58) Field of Classification Search
CPC ..................................................... H05B 6/062
(Continued)

(56) References Cited

U.S. PATENT DOCUMENTS 3,655,943 A * 4/1972 Holtkamp .................... 219/491
4,913,038 A * 4/1990 Burkett .............. A47J 37/1266
99/329 R (Continued)

FOREIGN PATENT DOCUMENTS

JP 62-217021 9/1987
JP 2-238221 9/1990

(Continued)

OTHER PUBLICATIONS

International Preliminary Report on Patentability issued May 11, 2010 in PCT/JP2008/002985 (Forms PCT/IB/338, PCT/IB/373 and PCT/ISA/237) (in English).

(Continued)

*Primary Examiner* — Tu B Hoang
*Assistant Examiner* — Diallo I Duniver
(74) *Attorney, Agent, or Firm* — Wenderoth, Lind & Ponack, L.L.P.

(57) ABSTRACT

There is provided a cooking device which can easily carry out heating setting when performing heating control according to a set temperature. A cooking device includes a heating unit (4) operable to heat an object to be heated; an operation unit (8) including temperature setting switch (11, 12*a*, 12*b*) for setting a heating temperature; a temperature sensor (7) operable to detect a temperature of the object to be heated; and a control unit (5) operable to control the heating unit so that the temperature detected by the temperature sensor is equal to the set temperature set by using the temperature setting switch; wherein the control unit automatically sets the cooking mode based on the set temperature.

6 Claims, 25 Drawing Sheets

(58) Field of Classification Search
USPC .......... 99/331; 219/627, 667, 661, 606, 608, 219/710, 391
See application file for complete search history.

(56) References Cited

U.S. PATENT DOCUMENTS

| | | | | |
|---|---|---|---|---|
| 4,918,293 A | | 4/1990 | McGeorge | |
| 5,073,701 A | | 12/1991 | Ljunggren | |
| 5,398,597 A | | 3/1995 | Jones et al. | |
| 6,570,136 B1 | * | 5/2003 | Lockwood et al. | 219/398 |
| 6,841,762 B2 | * | 1/2005 | Suzuki | 219/490 |
| 2006/0196869 A1 | * | 9/2006 | McWilliams et al. | 219/506 |
| 2006/0201930 A1 | * | 9/2006 | Shindo | 219/497 |

FOREIGN PATENT DOCUMENTS

| | | |
|---|---|---|
| JP | 10-69970 | 3/1998 |
| JP | 2004-69112 | 3/2004 |
| JP | 2006-120552 | 5/2006 |

OTHER PUBLICATIONS

International Search Report issued Dec. 9, 2008 in International (PCT) Application No. PCT/JP2008/002985.
Extended European Search Report issued Jun. 29, 2012 in corresponding European Application No. 08 84 2594.

* cited by examiner

Fig.5

| FIRST TABLE | | | |
|---|---|---|---|
| SET TEMPERATURE | BOIL | FRY | GRILL |
| 250 | | | ○ |
| 240 | | | ○ |
| 230 | | | ○ |
| 220 | | | ○ |
| 210 | | | ○ |
| 200 | | | ○ |
| 190 | | ○ | |
| 180 | | ○ | |
| 170 | | ○ | |
| 160 | | ○ | |
| 150 | | ○ | |
| 140 | | ○ | |
| 130 | | ○ | |
| 120 | | ○ | |
| 110 | ○ | | |
| 100 | ○ | | |
| 90 | ○ | | |
| 80 | ○ | | |
| 70 | ○ | | |
| 60 | ○ | | |
| 50 | ○ | | |

Fig.9

| SECOND TABLE | | | |
|---|---|---|---|
| SET TEMPERATURE | BOIL | FRY | GRILL |
| 250 | × | × | ○ |
| 240 | × | × | ○ |
| 230 | × | × | ○ |
| 220 | × | × | ○ |
| 210 | × | × | ○ |
| 200 | × | △ | ○ |
| 190 | × | ○ | △ |
| 180 | × | ○ | △ |
| 170 | × | ○ | △ |
| 160 | × | ○ | △ |
| 150 | × | ○ | △ |
| 140 | △ | ○ | △ |
| 130 | △ | ○ | △ |
| 120 | △ | ○ | △ |
| 110 | ○ | △ | × |
| 100 | ○ | △ | × |
| 90 | ○ | △ | × |
| 80 | ○ | × | × |
| 70 | ○ | × | × |
| 60 | ○ | × | × |
| 50 | ○ | × | × |

COOKING DEVICE

TECHNICAL FIELD

The present invention relates to a cooking device for heating an object to be heated according to a heating temperature set by a user.

BACKGROUND ART

Some cooking devices control heating according to various cooking modes such as a fry mode suited for fried food, and a grill mode suited for grilled food. In each cooking mode, the cooking device heats an object to be heated according to a heating temperature (° C.) set by a user (see e.g., Patent Document 1).

Patent Document 1: JP-A-10-69970

SUMMARY OF INVENTION

Problems to be Solved by the Invention

A conventional cooking device has a configuration for heating setting with a procedure of first selecting a cooking mode and then setting a heating temperature according to the selected cooking mode by a user. The user thus always needs to select the cooking mode before setting the heating temperature. This leads to a problem in that an operation related to the heating setting becomes difficult as the type of cooking mode increases. For example, if a plurality of switches are provided according to the type of cooking modes, respectively, the number of switches increases according to the increase in the type of cooking modes, and the switch corresponding to the desired cooking mode becomes difficult to readily be found. In other words, the operation related to selection of the cooking mode cannot be easily performed as the type of cooking modes increases. Therefore, the operation of the heating setting cannot be easily carried out in the conventional cooking device when performing the heating control according to the set temperature.

In view of solving the conventional problems described above, the present invention provides a cooking device which can easily carry out the heating setting when performing the heating control according to the set temperature. Specifically, the present invention provides a cooking device capable of automatically setting the cooking mode.

Means for Solving the Problems

A cooking device according to the present invention includes a plurality of cooking modes suited for various cooking, and is capable of heating an object to be heated with a control method corresponding to each of the cooking modes. The cooking device includes: a heating unit operable to heat the object to be heated; an operation unit including a temperature setting switch for setting a heating temperature; a temperature sensor operable to detect a temperature of the object to be heated; and a control unit operable to control the heating unit so that the temperature detected by the temperature sensor is equal to a set temperature set by using the temperature setting switch; wherein the control unit sets the cooking mode based on the set temperature set by using the temperature setting switches.

The temperature setting switch corresponds to a temperature adjustment key 11 and adjustment keys 12*a*, 12*b* in a first embodiment, correspond to a menu key 17 and adjustment keys 12*a*, 12*b* in a second embodiment, and correspond to a temperature adjustment key 28 and adjustment keys 12*a*, 12*b* in a third embodiment. When the heating temperature is set by the user, the cooking device of the present invention automatically sets the cooking mode normally used at the set heating temperature, and thus the user does not need to set the cooking mode in advance. In other words, the user merely needs to set the heating temperature. Therefore, according to the cooking device of the present invention, the heating setting can be easily carried out when performing the heating control according to the heating temperature.

The control unit may disable changing of the set cooking mode at a predetermined timing after the cooking mode is set based on the set temperature. The predetermined timing may be when a predetermined time has elapsed after setting the cooking mode. When the operation unit further includes a heating start switch for starting heating of the object to be heated, the predetermined timing may be when the heating start switch is operated. The control unit may limit the range of heating temperature settable by the temperature setting switch to within a predetermined range according to the set cooking mode after disabling changing of the cooking mode. In this case, the predetermined range is preferably wider than a heating temperature range assigned to each of the cooking modes when the cooking mode is automatically set.

The temperature change suited to various cooking methods can be made during cooking by having the settable range of the heating temperature after fixing the cooking mode wider than a heating temperature range assigned to each of the cooking modes during the automatic setting of the cooking mode. The user can be notified that the cooking mode is fixed by changing the settable range of the heating temperature before fixing and after fixing the cooking mode. The usability thus enhances.

The operation unit may include a plurality of switches. In this case, when a predetermined switch in the operation unit is operated for a predetermined time or longer, the control unit assigns a function of setting the cooking mode to one of the switches in the operation unit.

The user then can manually select the cooking mode, and the cooking device of the present invention can be used similar to the related art.

Effects of the Invention

According to the present invention, a procedure of selecting a cooking mode by a user can be omitted since the cooking device automatically sets the cooking mode according to a heating temperature set by the user. In other words, the user merely needs to set the heating temperature. Therefore, the number of operations until starting heating is reduced. A switch for selecting the cooking mode also does not need to be searched since the cooking mode does not need to be selected. Therefore, according to the present invention, the heating setting can be easily carried out when performing heating control according to the heating temperature.

BRIEF DESCRIPTION OF DRAWINGS

FIG. 5 is a correspondence table of a cooking mode and a heating set temperature at the time of automatic setting of a cooking mode according to the first embodiment of the present invention.

FIG. 9 is a correspondence table of the cooking mode and a heating temperature settable range after the cooking mode is fixed according to the first embodiment of the present invention.

Figure 1:
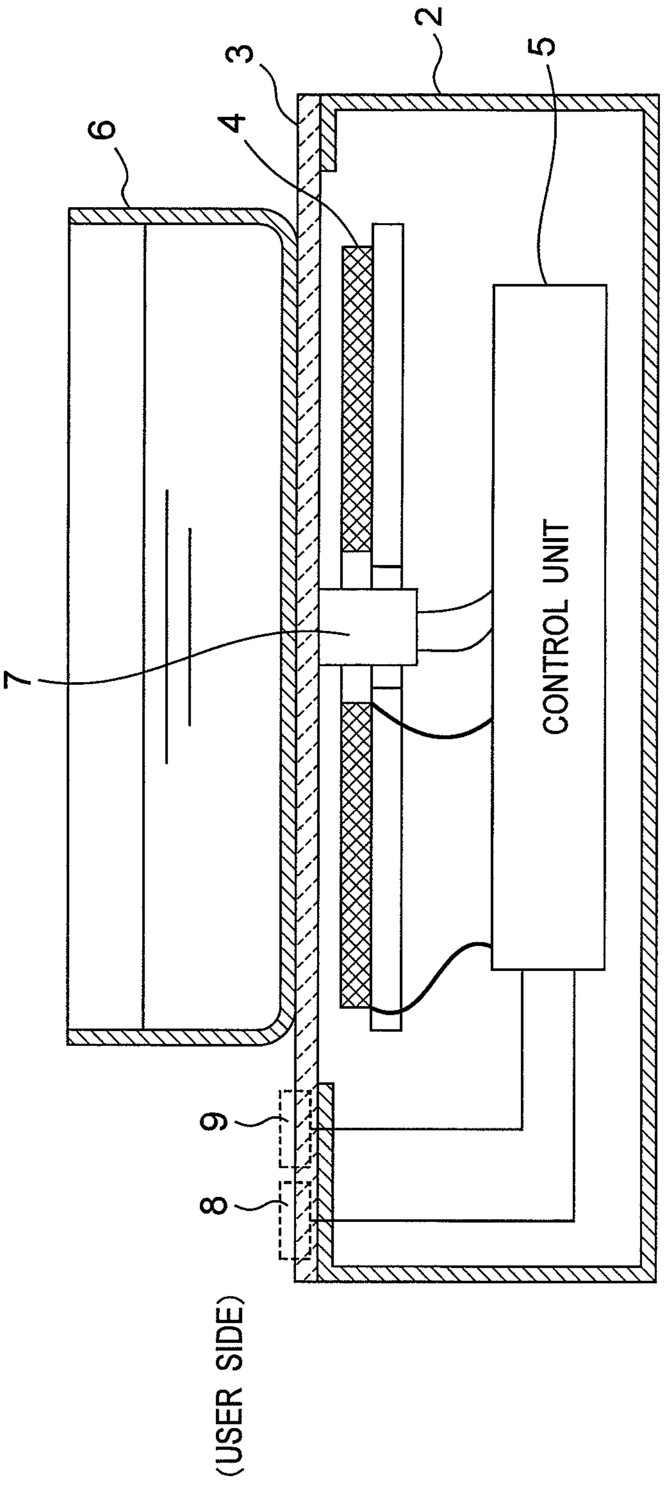
FIG. 1 is a cross-sectional view showing a configuration of a cooking device according to a first embodiment of the present invention.

| Description of Reference Numerals | |
|---|---|
| 1, 1a, 1b, 1c, 1d | mounting unit |
| 2 | main body |
| 3 | top plate |
| 4 | heating coil |
| 5 | control unit |
| 6 | object to be heated |
| 7 | temperature sensor |
| 8, 8a, 8b, 8c, 8d | operation unit |
| 9, 9a, 9b, 9c, 9d | display unit |
| 10, 27 | heating key |
| 11, 28 | temperature adjustment key |
| 12a, 12b | adjustment key |
| 14 | temperature display section |
| 15 | cooking mode display section |
| 16 | preheating display section |
| 17 | menu key |
| 18 | stop/start key |
| 30 | set output temperature display section |

DETAILED DESCRIPTION OF THE INVENTION

Embodiments of the present invention will be described below with reference to the drawings.

First Embodiment

A cooking device of a first embodiment of the present invention is capable of selectively performing heating control for heating an object to be heated according to a heating output (W) set by a user (referred to as "heating control by output adjustment") and heating control for heating an object to be heated according to a heating temperature (° C.) set by the user (referred to as "heating control by temperature adjustment"). The cooking device of the present embodiment has a feature in that a cooking mode is automatically set according to the heating temperature set by the user when performing the heating control by temperature adjustment. The cooking mode in the present embodiment includes a boil mode suited for cooking boiled food, a fry mode suited for cooking fried food, and a grill mode suited for cooking grilled food.

1.1 Configuration of Cooking Device

FIG. 1 shows a cooking device according to a first embodiment of the present invention. In the present embodiment, an induction cooking device for induction-heating the object to be heated is used as the cooking device. The cooking device of the present embodiment includes a main body 2 configuring a shell of the cooking device, and a top plate 3 provided on an upper surface of the main body 2. The top plate 3 is made of an electrical insulating material such as crystallized glass. A heating coil 4 for induction-heating an object 6 to be heated is arranged under the top plate 3.

An operation unit 8 for inputting instructions of heating setting such as heating temperature and heating output from the user, and a display unit 9 for displaying a state of the instructed heating setting are arranged on a near side (user side) of the top plate 3.

The cooking device of the present embodiment further includes a control unit 5 for flowing a high frequency current to the heating coil 4, and a temperature sensor 7 for detecting the temperature of the object 6 to be heated. The temperature sensor 7 includes a thermistor and/or an infrared sensor. The control unit 5 is electrically connected to the heating coil 4, the temperature sensor 7, the operation unit 8, and the display unit 9. The control unit 5 controls an amount of high frequency current to be supplied to the heating coil 4 according to the heating setting inputted through the operation unit 8. For example, when performing heating control by the temperature adjustment, the control unit 5 controls an amount of the high frequency current to be supplied to the heating coil 4 so that the temperature of the object to be heated detected by the temperature sensor 7 is equal to the heating temperature set through the operation unit 8. The control unit 5 automatically sets the cooking mode according to the heating temperature set by the user when starting the heating control by temperature adjustment, and controls the heating coil 4 with a control method corresponding to the set cooking mode. For example, assuming a large amount of oil is present in the object 6 to be heated such as a pan in the fry mode, a small amount of oil is present in the object 6 to be heated such as a frying pan in the grill mode, and water is present in the object 6 to be heated such as a pan in the boil mode, the heating coil 4 is controlled based on the temperature detected by the temperature sensor 7 with a control method corresponding to the respective assumed state. The control unit 5 switches a display of the display unit 9 according to the heating setting inputted through the operation unit 8.

Figure 2:
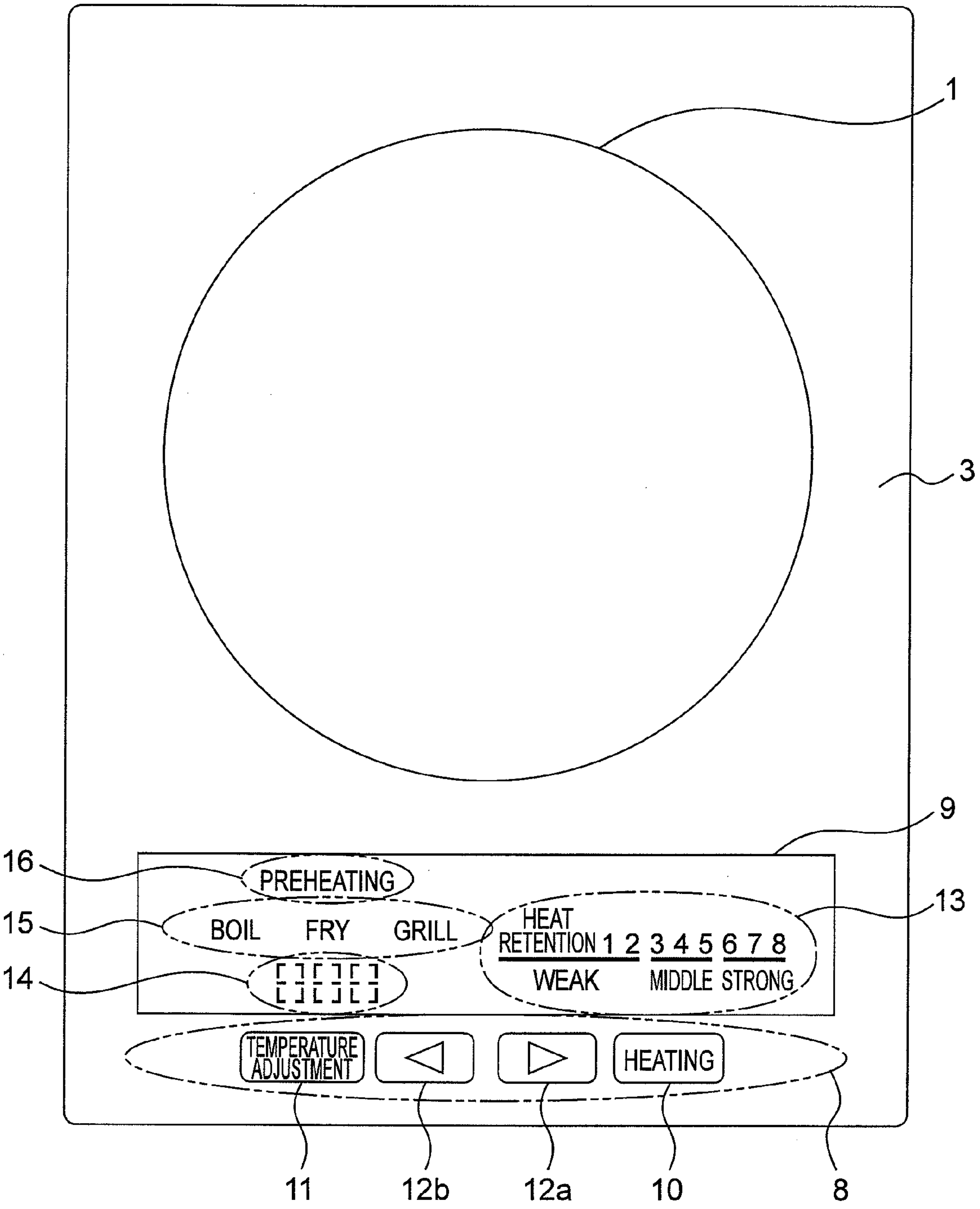
FIG. 2 is a plan view showing the configuration of the cooking device according to the first embodiment of the present invention.

FIG. 2 shows a plan view of the cooking device of the present embodiment. The top plate 3 includes a mounting unit 1 showing a mounting area of the object to be heated through printing and the like at a position opposing the heating coil 4.

The operation unit 8 is configured by one or more keys assigned with various functions. The key of the operation unit 8 is configured by a touch switch using electrostatic capacitance. In the present embodiment, the operation unit 8 includes a heating key 10 assigned with a function of starting and stopping the heating control by output adjustment, a temperature adjustment key 11 assigned with a function of starting and stopping the heating control by temperature adjustment, and adjustment keys 12*a*, 12*b* for increasing and decreasing the set value of the heating output and the heating temperature. The heating key 10 and the temperature adjustment key 11 operate to start heating if they are operated in a heating stop state, and operate to stop heating if they are operated while heating. The adjustment keys 12*a*, 12*b* are operable after the heating key 10 or the temperature adjustment key 11 is operated and the heating is started. The adjustment keys 12*a*, 12*b* operate to set a heating output value if the heating key 10 is operated and the heating control by output adjustment is started, and operate to set the heating temperature if the temperature adjustment key 11 is operated and the heating control by temperature adjustment is started.

The display unit 9 is configured by forming a part of the top plate 3 to transmit light and arranging a liquid crystal display member at the part. The display unit 9 includes an output display section 13 for indicating the magnitude of the heating output, a temperature display section 14 for indicating the heating temperature, a cooking mode display section 15 for indicating the cooking mode, and a preheating display section 16 for indicating preheating. The output display section 13 is in a displayed state during the heating control by output adjustment. The output display section 13 is provided at a position (right side in FIG. 2) corresponding to the heating key 10 in the display unit 9. The temperature display section 14, the cooking mode display section 15, and the preheating display section 16 are in the displayed state during the heating control by temperature adjustment. The temperature display section 14, the cooking mode display section 15, and the preheating display section 16 are provided at a position (left side in FIG. 2) corresponding to the temperature adjustment key 11 in the display unit 9. The temperature display section 14 displays the set heating temperature. The cooking mode display section 15 indicates which one of the boil mode, the fry mode, or the grill mode is set. The preheating display section 16 indicates that the set heating temperature is not yet reached with characters "preheating". In FIG. 2, each display in the display unit 9 are all displayed to clarify the content displayable in the display unit 9, which is different from the actual display at the time of normal use.

1.2 Operation of Cooking Device

Figure 3:
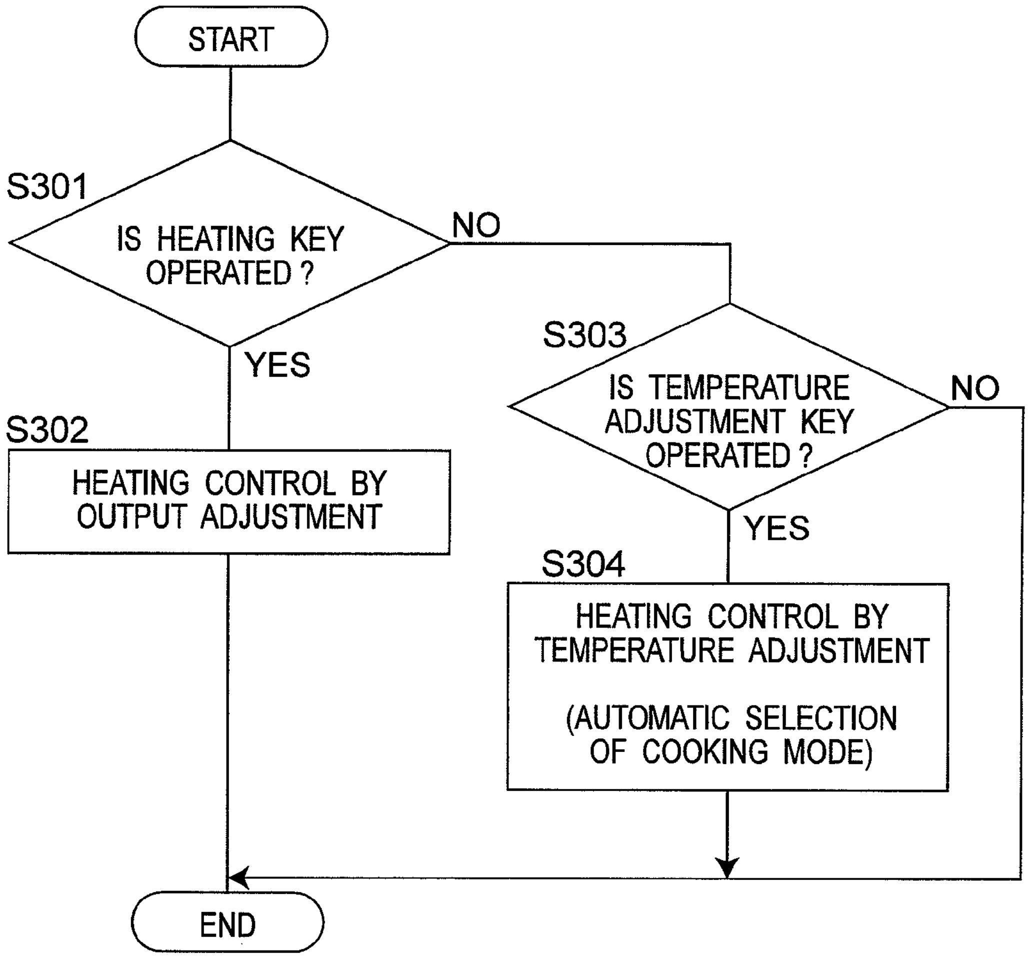
FIG. 3 is a flowchart showing a schematic operation of the cooking device according to the first embodiment of the present invention.

The schematic operation of the cooking device of the present embodiment configured as above is shown in FIG. 3. After power of the cooking device is turned on, the control unit 5 determines whether or not the heating key 10 is operated (S301). If the heating key 10 is operated (Yes at S301), the control unit 5 controls the heating coil 4 to perform heating control by output adjustment (W) (S302). If the heating key 10 is not operated (No at S301), the control unit 5 determines whether or not the temperature adjustment key 11 is operated (S303). If the temperature adjustment key 11 is operated (Yes at S303), the control unit 5 controls the heating coil 4 to perform heating control by temperature adjustment (° C.) (S304). In this case, the control unit 5 automatically selects the cooking mode based on the set temperature.

Figure 4:
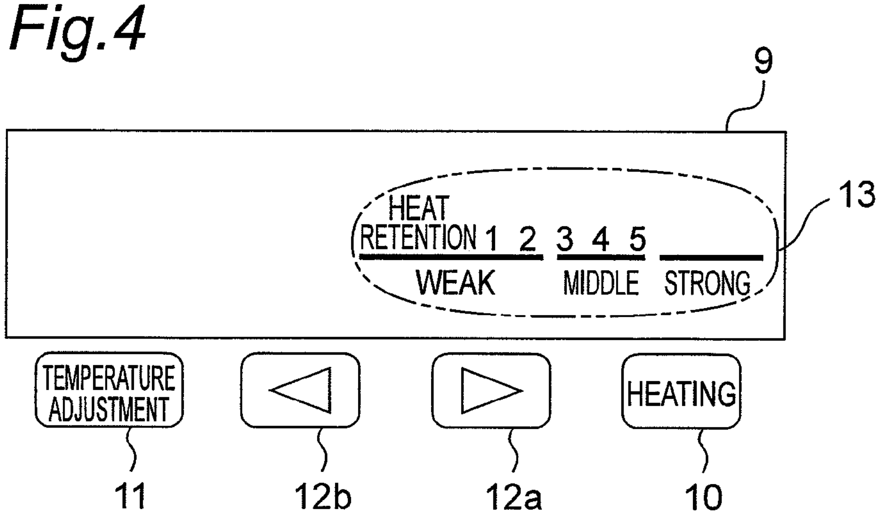
FIG. 4 is a display example of a display unit in the heating control by output adjustment according to the first embodiment of the present invention.

The heating control by output adjustment (S302), which is the normal heating control generally provided to the heating device, will be described with reference to FIG. 4. When the power of the cooking device is turned on and the heating key 10 is operated by the user, only the output display section 13 is displayed in the display unit 9. In this case, for example, a default value (up to "5") is displayed. The control unit 5 controls the heating coil 4 according to the set value of the heating output displayed in the output display section 13. For example, if the set value of the heating output is displayed up to "5", as shown in FIG. 4, the object 6 to be heated is heated so that the output of the heating coil 4 becomes 1 kW. The heating output can be changed by the adjustment keys 12*a*, 12*b*. For example, the control unit 5 controls the heating coil 4 to increase the heating output every time the adjustment key 12*a* is pushed and to decrease the heating output every time the adjustment key 12*b* is pushed. The output display section 13 displays the magnitude of the heating output by illuminating up to the number corresponding to the heating output.

The heating control by temperature adjustment (S304) will be described with reference to FIGS. 5 to 7. FIG. 5 shows a correspondence table (referred to as "first table") of the set temperature and the cooking mode at the time of automatic setting of the cooking mode. In the present embodiment, the set temperature from 50° C. to 110° C. corresponds to the boil mode, the set temperature from 120° C. to 190° C. corresponds to the fry mode, and the set temperature from 200° C. to 250° C. corresponds to the grill mode. The control unit 5 automatically sets the cooking mode according to the heating temperature set through the operation unit 8 according to the first table.

Figure 6:
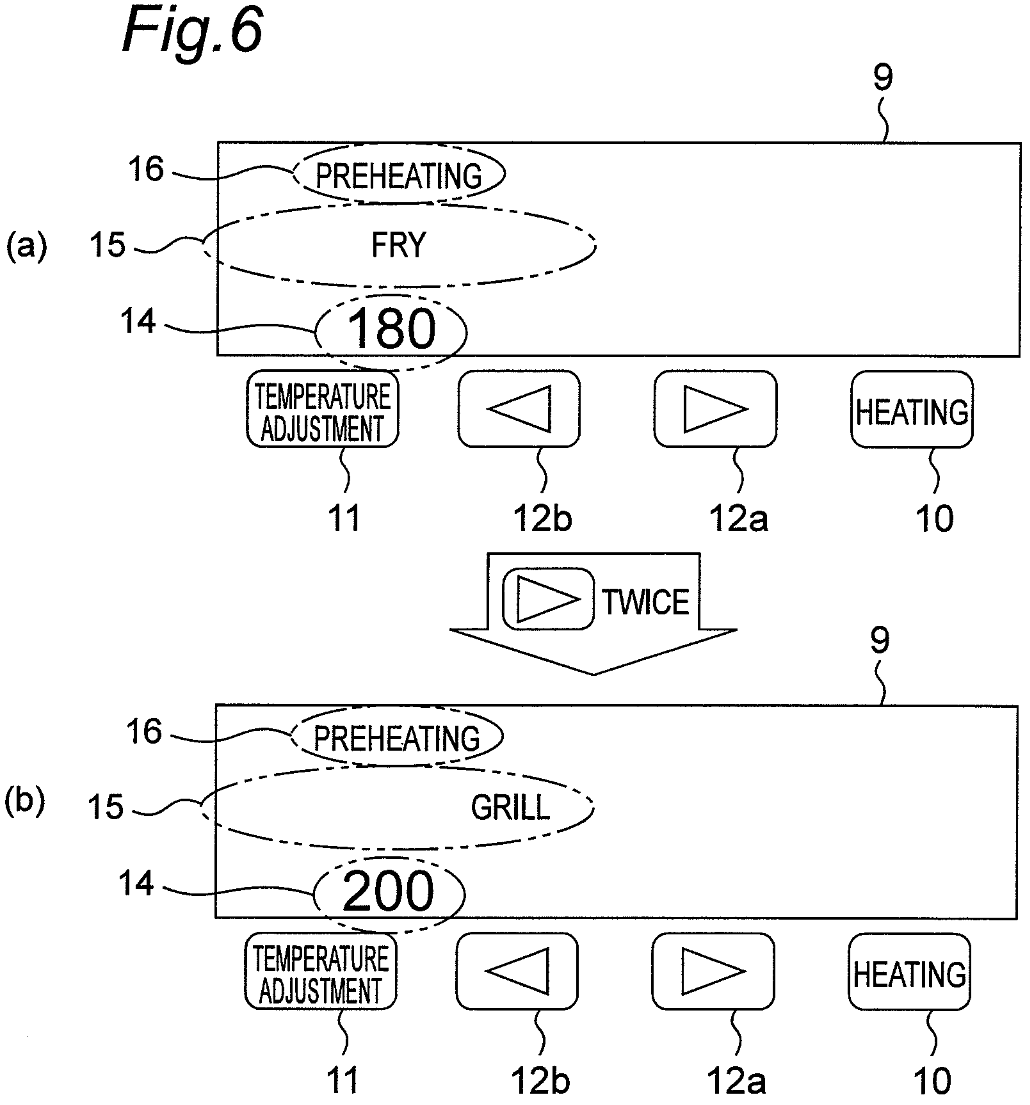
FIG. 6 is a display example of a display unit in the heating control by temperature adjustment according to the first embodiment of the present invention.

FIG. 6 shows a display example of the display unit 9 at the time of heating control by temperature adjustment. FIG. 6(*a*) shows a state immediately after the instruction of heating control by temperature adjustment is inputted. In the present embodiment, 180° C. is set as an initial value in a case where the instruction of heating control by temperature adjustment is inputted. When a power switch (not shown) is turned on and the temperature adjustment key 11 is operated by the user, the cooking device starts the operation in the fry mode, and starts to heat the object 6 to be heated so that the detection temperature of the temperature sensor 7 reaches 180° C. In this case, characters "180" indicating 180° C. of the initial value are displayed in the temperature display section 14. As shown in FIG. 5, 180° C. is the temperature suited for the fry mode, and thus characters "fry" indicating the fry mode are displayed in the cooking mode display section 15. Since the temperature of the object to be heated has not reached 180° C. at the start of heating, characters "preheating" are displayed in the preheating display section 16.

FIG. 6(*b*) shows a display example of the display unit 9 in the case where the heating temperature is set to be 200° C. When the adjustment key 12*a* is operated twice from the state of FIG. 6(*a*), the set temperature changes from 180° C. to 200° C., and characters "200" indicating 200° C. are displayed in the temperature display section 14, as shown in FIG. 6(*b*). As shown in FIG. 5, 200° C. is the temperature corresponding to the grill mode, and thus characters "grill" indicating the grill mode are displayed in the cooking mode display section 15. The cooking device operates in the grill mode, and heats the object 6 to be heated so that the detection temperature of the temperature sensor 7 reaches 200° C.

Figure 7:
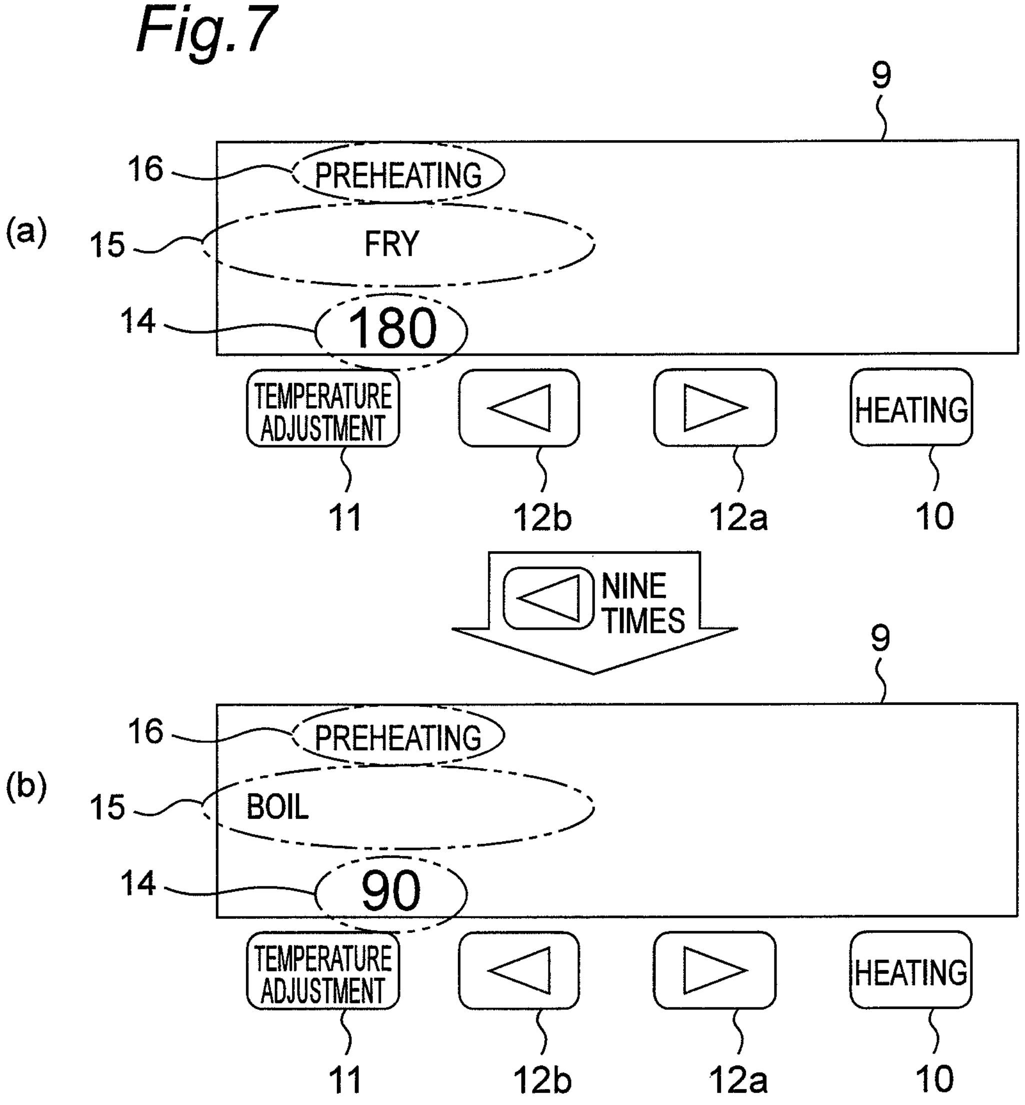
FIG. 7 is another display example of a display unit in the heating control by temperature adjustment according to the first embodiment of the present invention.

FIG. 7 shows a further display example of the display unit 9 at the time of heating control by temperature adjustment. FIG. 7(*a*) shows a state immediately after the instruction of heating control by temperature adjustment is inputted. FIG. 7(*a*) is the same as FIG. 6(*a*). FIG. 7(*b*) shows a display example of the display unit 9 in the case where the heating temperature is set to 90° C. When the adjustment key 12*b* is operated nine times after the heating control by temperature adjustment is started, the set temperature changes from 180° C. to 90° C., and characters "90" indicating 90° C. are displayed in the temperature display section 14, as shown in FIG. 7(*b*). As shown in FIG. 5, 90° C. is the temperature corresponding to the boil mode, and thus characters "boil" indicating the boil mode are displayed in the cooking mode display section 15. The cooking device operates in the boil mode, and heats the object 6 to be heated so that the detection temperature of the temperature sensor 7 reaches 90° C.

In FIGS. 6 and 7, the control unit 5 displays the characters "preheating" on the preheating display section 16 until the detection temperature of the temperature sensor 7 reaches the set temperature. The control unit 5 hides the characters "preheating" of the preheating display section 16 when the detection temperature of the temperature sensor 7 reaches the set temperature. In this case, the user may be notified that the set temperature is reached with a buzzer sound, and the like.

1.3 Conclusion

In the present embodiment, the cooking mode is automatically selected according to the set heating temperature with reference to the first table shown in FIG. 5. Thus, the operation for the setting of the cooking mode by the user can be omitted when performing the heating setting with various types of cooking modes (boil, fry, grill, and the like). The operability is thus improved. The user can easily perform the heating setting since the user merely needs to set the heating temperature. Furthermore, since a key for selecting a cooking mode need not be provided in the operation unit 8, the operation unit 8 can be simply configured at low-cost.

(Variant 1)

Figure 8:
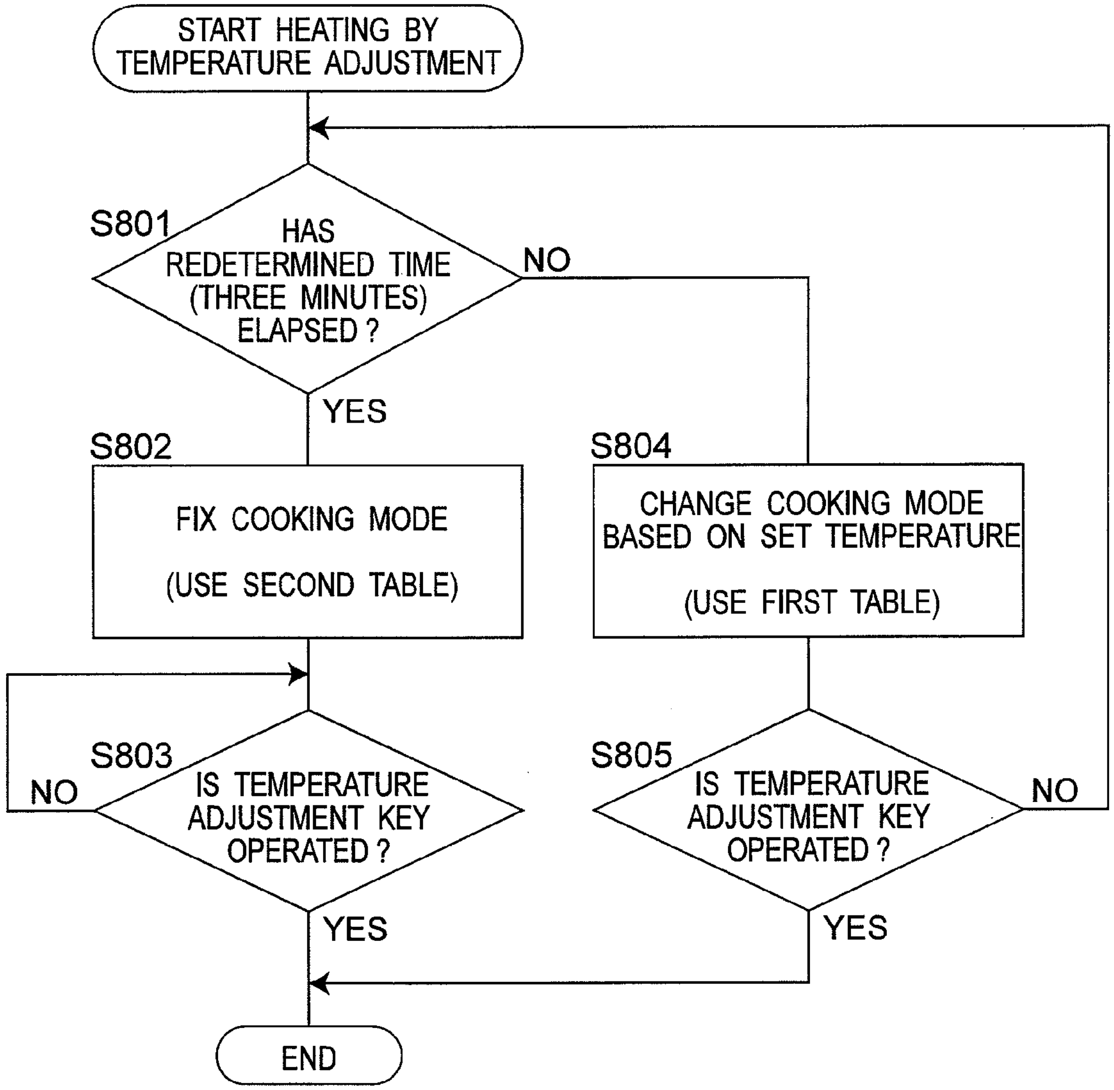
FIG. 8 is a flowchart in the heating control by temperature adjustment according to the first embodiment of the present invention.

In the first embodiment, the set cooking mode may not be changeable at a predetermined timing. For example, the cooking mode set after elapse of a predetermined time (e.g., three minutes) may be fixed when the predetermined time has elapsed after automatic setting of the cooking mode based on the change of the set temperature by the adjustment keys 12*a*, 12*b*. Furthermore, the cooking mode set after elapse of a predetermined time (e.g., three minutes) may be fixed when the predetermined time has elapsed after the temperature adjustment key 11 is operated and heating by temperature adjustment is started. The example of such a case will be specifically described with reference to FIG. 8.

The control unit 5 determines whether or not a predetermined time (e.g., three minutes) has elapsed after the temperature adjustment key 11 is operated and the heating by temperature adjustment is started (S801). Until the predetermined time has elapsed (No at S801), the cooking mode is automatically changed based on the set temperature set by the adjustment keys 12*a*, 12*b* (S804). The cooking mode is determined based on the first table shown in FIG. 5. The control unit 5 determines whether or not the temperature adjustment key 11 for controlling ON/OFF of heating by temperature adjustment is operated (S805). When the temperature adjustment key 11 is again operated, the control unit 5 stops the heating by temperature adjustment. The process returns to step S801 if the temperature adjustment key 11 is not operated.

If the predetermined time has elapsed after the heating by temperature adjustment is started (Yes at S801), the control unit 5 fixes the cooking mode being set at the time, and then prevents the mode from being changed to other cooking modes even if the adjustment keys 12*a*, 12*b* are operated (S802). In this case, the control unit 5 limits the setting range of the heating temperature based on the cooking mode according to a second table shown in FIG. 9 (FIG. 9 will be described later). After fixing the cooking mode, the control unit 5 determines whether or not the temperature adjustment key 11 for controlling ON/OFF of heating by temperature adjustment is operated (S803). When the temperature adjustment key 11 is again operated, the control unit 5 stops the heating control by temperature adjustment.

FIG. 9 shows the second table defining the settable range of the heating temperature after the cooking mode is fixed. In FIG. 9, symbols ○ and Δ indicate settable temperatures, and a symbol x indicates the unsettable temperature. For example, 50° C. to 140° C. is the settable temperature for the boil mode, 90° C. to 200° C. is the settable temperature for the fry mode, and 120° C. to 250° C. is the settable temperature for the grill mode. In this case, the symbol ○ is the temperature assigned to the cooking mode before the cooking mode is fixed, and the symbol Δ is the temperature that can be set after the cooking mode is fixed. For example, the fry mode is automatically selected if the heating temperature is set to 150° C. before the cooking mode is fixed, and thus it is impossible to set the grill mode of 150° C. (see symbol ○). However, after the cooking mode is fixed, 150° C. can be specified in the grill mode (see symbol Δ).

In this manner, the setting range of the heating temperature corresponding to the cooking mode thus becomes wider than the initial setting range after the cooking mode is fixed, and hence the usability is improved. For example, in the case of the heating temperature of grilled food, the settable range is widened from "200° C. to 250" to "120° C. to 250° C." after the cooking mode is fixed. Thus, it becomes possible that a high temperature of 220° C. is first specified to grill a front surface of a steak at 220° C. in the grill mode, and then a slightly lower temperature of 190° C. is set to grill a back surface of the steak at 190° C. in the grill mode. The safety can be increased since the range of the heating temperature that cannot be set is defined according to the cooking mode (see symbol x). For example, in the fry mode, danger of oil firing and the like can be prevented since 210° C. and higher cannot be set. The cooking can be easily carried out by making the temperature setting unnecessary for cooking unusable.

When changing the fixed cooking mode after the cooking mode is once fixed, the temperature adjustment key 11 is operated to once stop the heating, and then the temperature adjustment key 11 is again operated to start new heating. In this case, the heating control returns to the initial state. In other words, the process again starts from step S301 of FIG. 3. Thus, for example, the cooking can be carried out in the fry mode after cooking in the grill mode.

(Variant 2)

Figure 10:
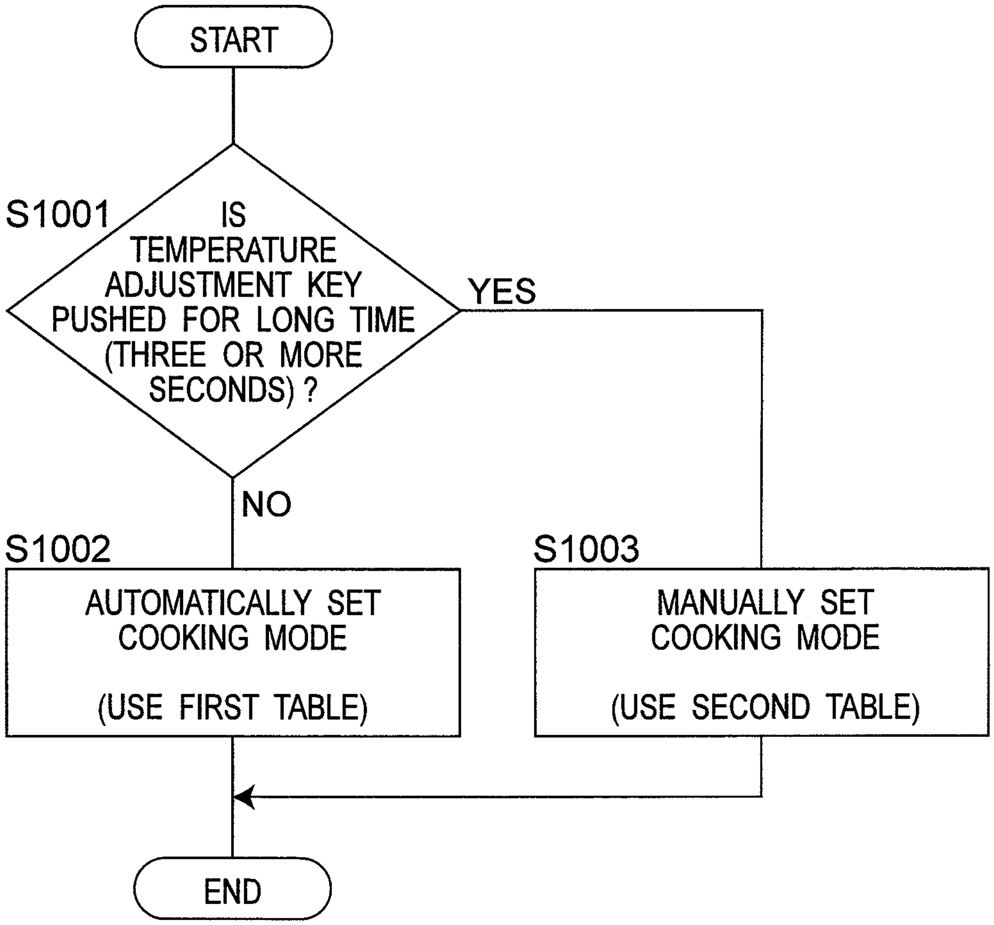
FIG. 10 is a flowchart showing an operation of switching automatic setting and manual setting of the cooking mode in the cooking device according to the first embodiment of the present invention.

The cooking mode is automatically set based on the set temperature in the first embodiment, but the cooking mode may be manually set. For example, the cooking mode may be manually set by pushing a predetermined key for a long time. An example of such a case will be described with reference to FIGS. 10 to 12. FIG. 10 shows a flowchart of switching the automatic/manual setting of the cooking mode. The control unit 5 determines whether or not the temperature adjustment key 11 is pushed long after the power is turned on (S1001). In other words, the control unit 5 determines whether or not the pushed state has lasted a predetermined time (e.g., three seconds) when the temperature adjustment key 11 is pushed.

If the temperature adjustment key 11 is not pushed long (No at S1001), that is, if the state returns to the un-pushed state within three seconds after the temperature adjustment key 11 is pushed, the cooking mode is automatically set based on the set temperature (S1002). In this case, the cooking mode is set based on the first table shown in FIG. 5. If the temperature adjustment key 11 is pushed long (Yes at S1001), that is, if the temperature adjustment key 11 is continuously pushed for three or more seconds, the control unit 5 controls the operation unit 8 and the display unit 9 so that the cooking mode can be manually set (S1003). For example, the function of setting the cooking mode is assigned to one of the keys in the operation unit 8. When the cooking mode is manually set, a correspondence relationship of the cooking mode and the heating temperature may differ from the first table shown in FIG. 5. For example, the heating temperature of a range wider than the temperature range shown in the first table may be set according to the selected cooking mode. The settable range of the heating temperature when manually setting the cooking mode may be based on the second table shown in FIG. 9. An example of such a case will be specifically described below with reference to FIGS. 11 and 12.

Figure 11:
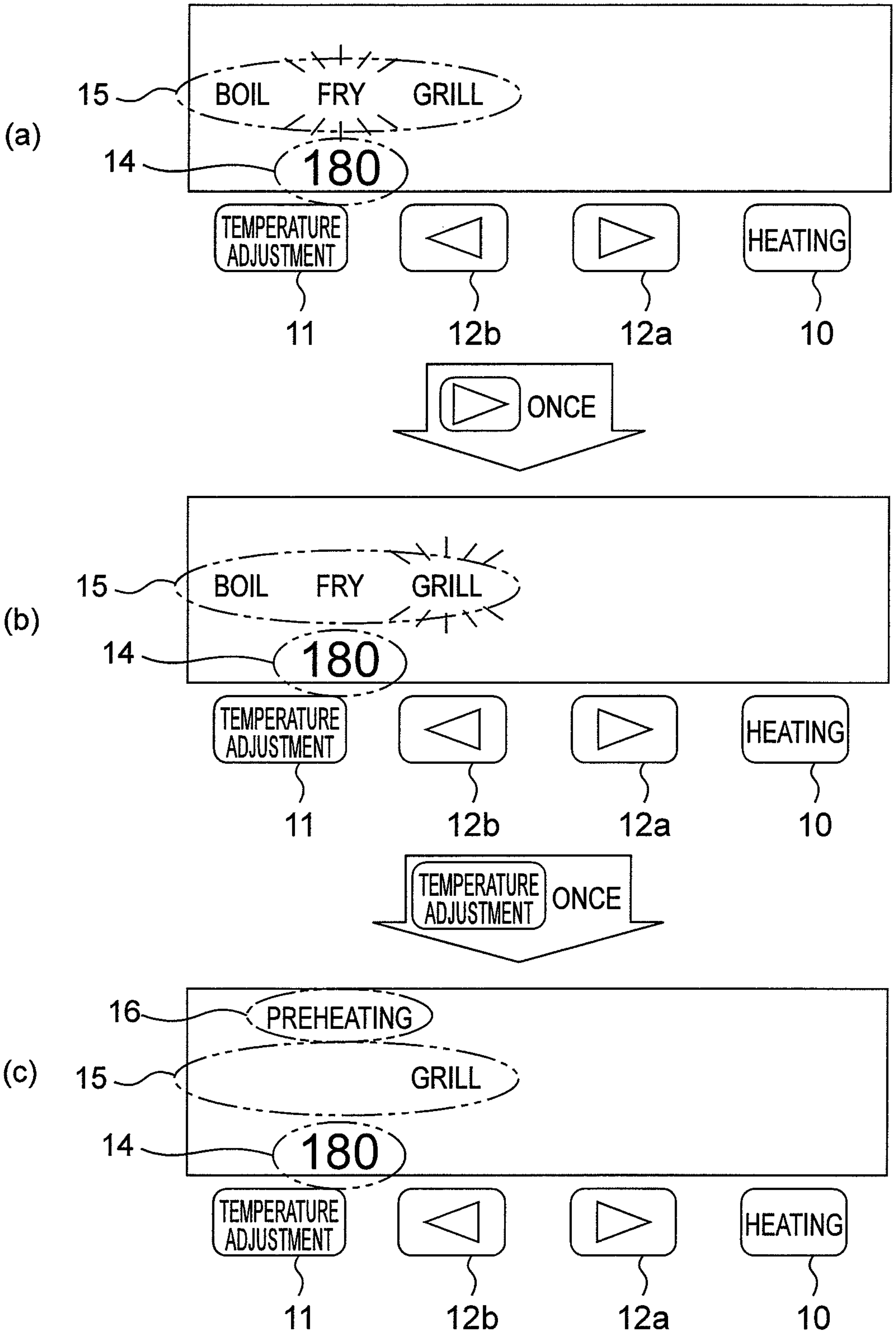
FIG. 11 is a display example of the display unit in the manual setting of the cooking mode according to the first embodiment of the present invention.

FIG. 11 shows an example of manually setting the cooking mode. When the temperature adjustment key 11 is pushed long, the control unit 5 sets the cooking mode to the default fry mode, and sets the heating temperature to the default 180° C. At this time, the characters "fry" are flashed on and off in the cooking mode display section 15, and the other characters "boil" and "grill" are lighted-up (FIG. 11(*a*)). This indicates that the currently selected cooking mode is the fry mode. The characters "180" corresponding to the set temperature 180° C. are also displayed in the temperature display section 14. The heating is not yet started if the type of cooking mode is in the flashing state.

The control unit 5 can change the cooking mode with the adjustment keys 12*a*, 12*b* when manually setting the cooking mode. For example, when the user operates the adjustment key 12*a* once in the state of FIG. 11(*a*), the control unit 5 changes the cooking mode from the fry mode to the grill mode, and flashes the characters "grill" on and off to indicate that the currently selected cooking mode is the grill mode (FIG. 11(*b*)). In this case, the temperature same as one before the change can be maintained if the set temperature before the change is within the settable range of the set temperature corresponding to the cooking mode after the change. In the example of FIG. 11, 180° C. before the change is within the settable range of the grill mode after the change according to the second table shown in FIG. 9, and thus the set value 180° C. is maintained. If the set temperature before the change is not within the range of the set temperature corresponding to the cooking mode after the change, the temperature closest to the temperature before the change is set as a default based on the second table.

When the temperature adjustment key 11 is operated in the state of FIG. 11(*b*), the cooking mode is fixed to the grill mode and the heating is started. In this case, the characters "grill" are lighted-up, and the light of the characters "boil" and "fry" are turned off (FIG. 11(*c*)). The characters "preheating" are displayed until the detection temperature of the temperature sensor 7 reaches the set temperature 180° C. After the cooking mode is fixed, the set value of the heating temperature can be changed by the adjustment keys 12*a*, 12*b*. In this case, the settable range of the heating temperature is limited according to the second table shown in FIG. 9.

Figure 12:
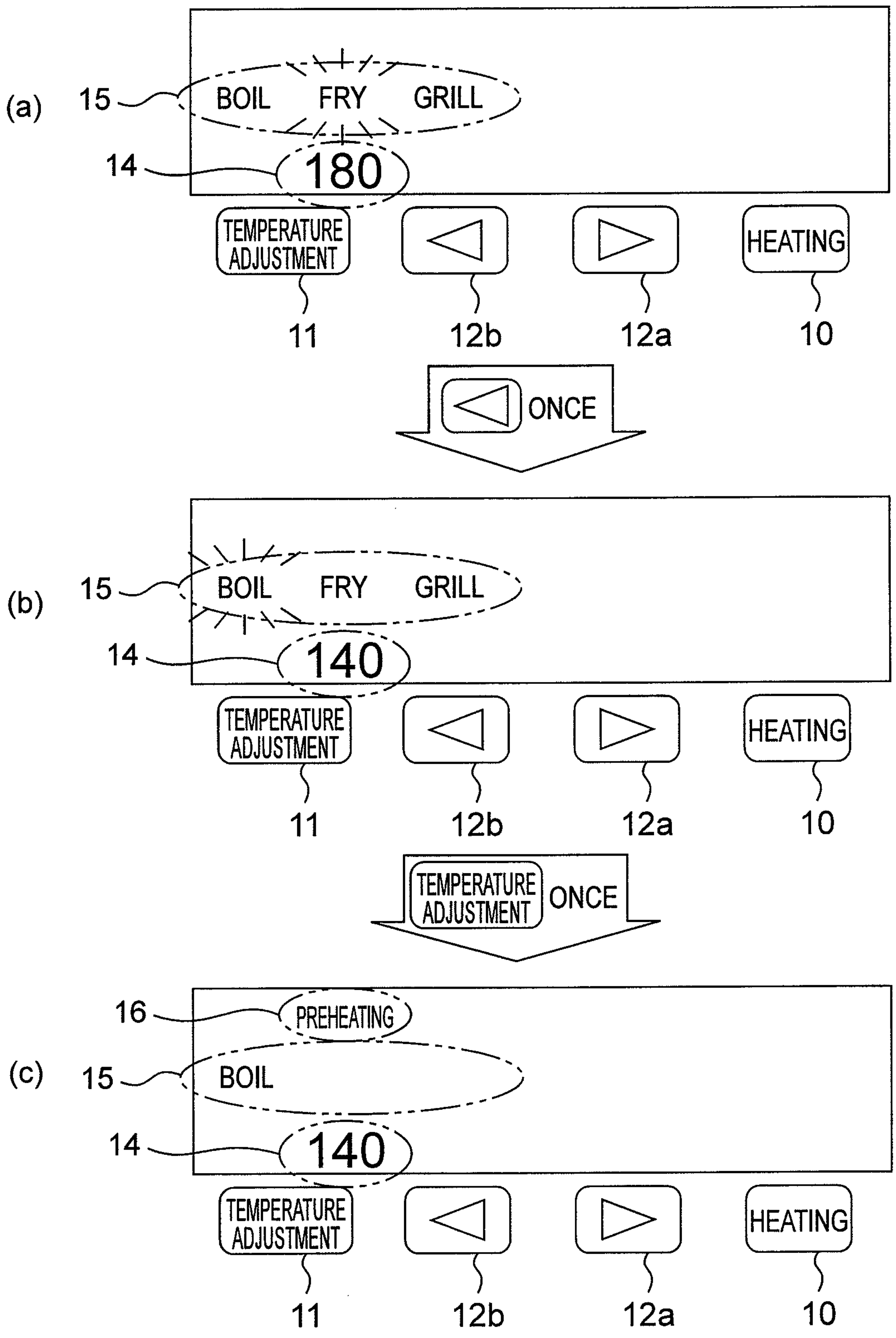
FIG. 12 is a display example of the display unit in the manual setting of the cooking mode according to the first embodiment of the present invention.

FIG. 12 shows another example of manually setting the cooking mode. FIG. 12(*a*) is the same as FIG. 11(*a*), and shows a state in which the fry mode, which is the default cooking mode, is selected immediately after the temperature adjustment key 11 is pushed long. When the adjustment key 12*b* is operated once in such a state, the control unit 5 changes the selected cooking mode from the fry mode to the boil mode. In this case, the characters "boil" are flashed on and off to indicate that the currently selected cooking mode is the boil mode (FIG. 12(*b*)). When changed from the fry mode to the boil mode, the set temperature 180° C. before the change becomes outside the settable range of the boil mode, and thus 140° C., which is within the settable range and closest to before the change, is set as a default value according to the second table. When the temperature adjustment key 11 is operated in such a state, the boil mode is fixed and the heating is started. In this case, the characters "boil" are lighted-up, and the light of the characters "fry" and "grill" are turned off (FIG. 12(*c*)). The characters "preheating" are displayed until the detection temperature of the temperature sensor 7 reaches the set temperature 140° C.

In this manner, the cooking device of the present invention can be used through the same usage method as the related art by enabling the cooking mode to be manually selected.

Second Embodiment

A cooking device according to a second embodiment of the present invention will be described with reference to FIGS. 13 to 18.

2.1 Configuration of Cooking Device

Figure 13:
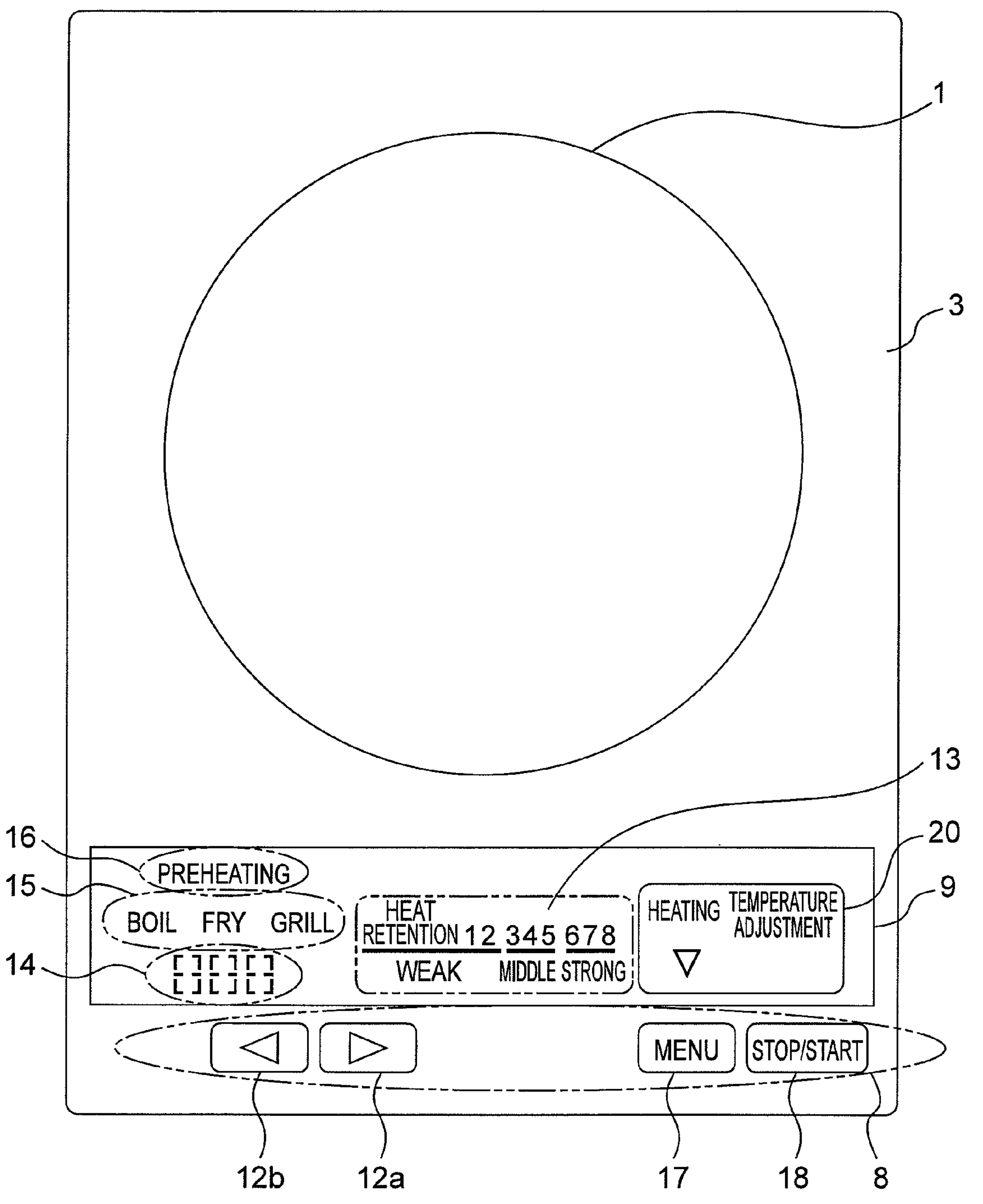
FIG. 13 is a plan view showing a configuration of a cooking device according to a second embodiment of the present invention.

FIG. 13 shows a configuration of the cooking device according to the present embodiment. In FIG. 13, the same reference numerals denote the same components as those in FIG. 2, and the detailed description thereof will not be given. The cooking device according to the second embodiment differs from the cooking device according to the first embodiment in the configuration of a part of the operation unit 8 and a part of the display unit 9. In other aspects, the second embodiment is same as the first embodiment. In other words, the cooking mode is automatically set based on the first table shown in FIG. 5 until the cooking mode is fixed, and the setting range of the heating temperature is limited according to the cooking mode based on the second table shown in FIG. 9 when the cooking mode is fixed.

The operation unit 8 of the present embodiment includes a menu key 17 and a stop/start key 18 in place of the temperature adjustment key 11 and the heating key 10 in the first embodiment. The menu key 17 is assigned with a function of selecting the type of heating control such as the heating control by output adjustment and the heating control by temperature adjustment. Specifically, in the present embodiment, the heating control by output adjustment and the heating control by temperature adjustment are alternately switched every time the menu key 17 is operated. The stop/start key 18 is assigned with a function of starting heating and stopping heating.

The display unit 9 includes a menu display section 20 showing the type of heating control such as heating control by output adjustment (indicated by the characters "heating") and heating control by temperature adjustment (indicated by the characters "temperature adjustment").

2.2 Operation of Cooking Device

Figure 14:
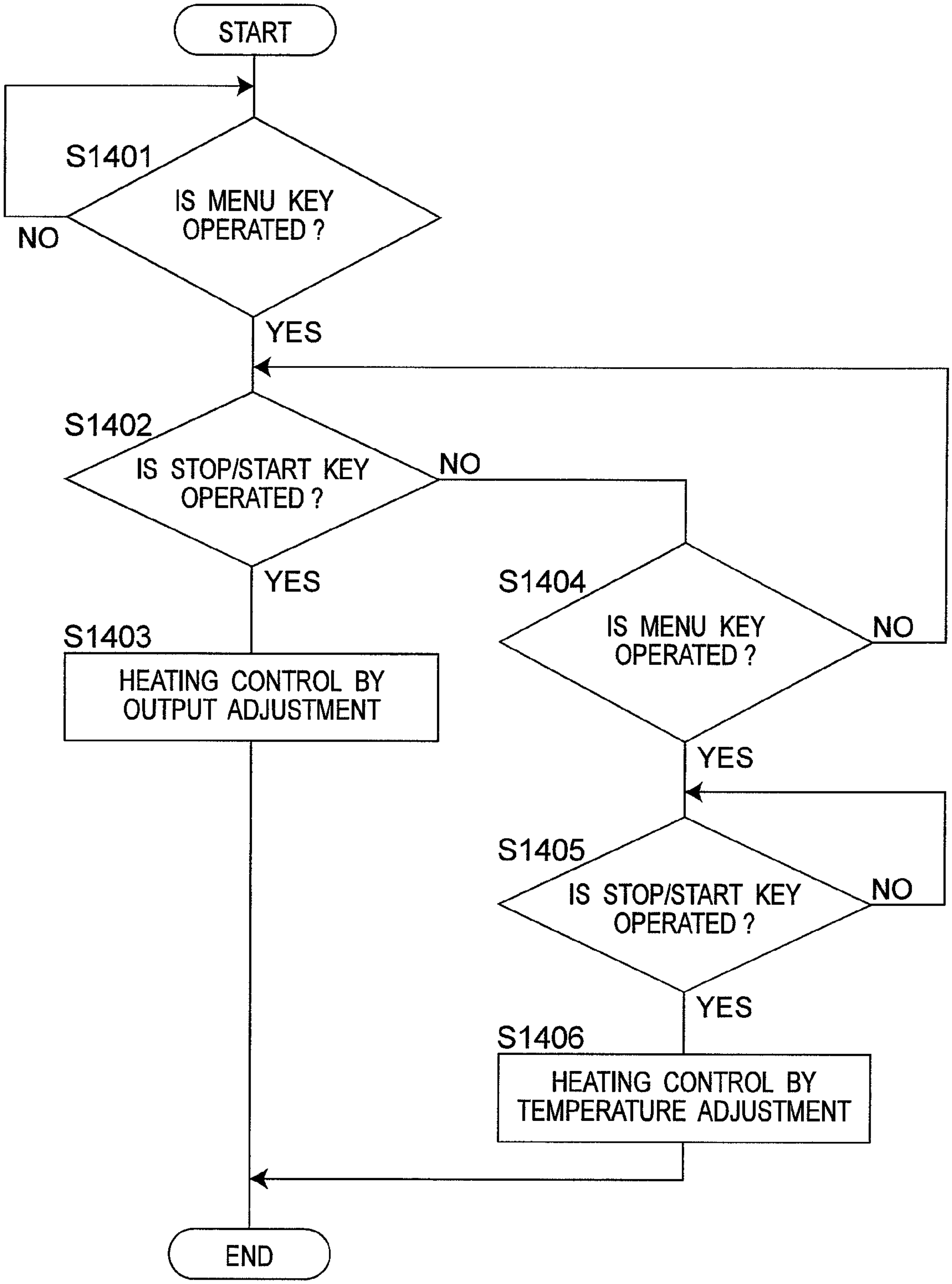
FIG. 14 is a flowchart showing a schematic operation of the cooking device according to the second embodiment of the present invention.

The schematic operation of the cooking device according to the present embodiment configured as above is shown in FIG. 14. After the power of the cooking device is turned on, the control unit 5 determines whether or not the menu key 17 is operated (S1401). If the menu key 17 is operated once (Yes at S1401), the heating control by output adjustment is selected. The control unit 5 determines whether or not the stop/start key 18 is operated in such a state (S1402). If the stop/start key 18 is operated, the control unit 5 controls the heating coil 4 to perform the heating control by output adjustment (S1403).

The control unit 5 determines whether or not the menu key 17 is again operated (S1404) without operating the stop/start key 18 (No at S1402) after the menu key 17 is operated once (Yes at S1401). If the menu key 17 is again operated, the heating control by temperature adjustment is selected. The control unit 5 determines whether or not the stop/start key 18 is operated in such a state (S1405). If the stop/start key 18 is operated, the control unit 5 controls the heating coil 4 to perform the heating control by temperature adjustment (S1406).

A case of performing the heating control by output adjustment (S1403) will be described with reference to FIG. 15. First, when the power switch (not shown) is turned on, only a symbol "∇" is displayed in the menu display section 20 at a position near the menu key 17 (FIG. 15(*a*)). The symbol "∇" is a guide for inducing a user to push the menu key 17 next.

Figure 15:
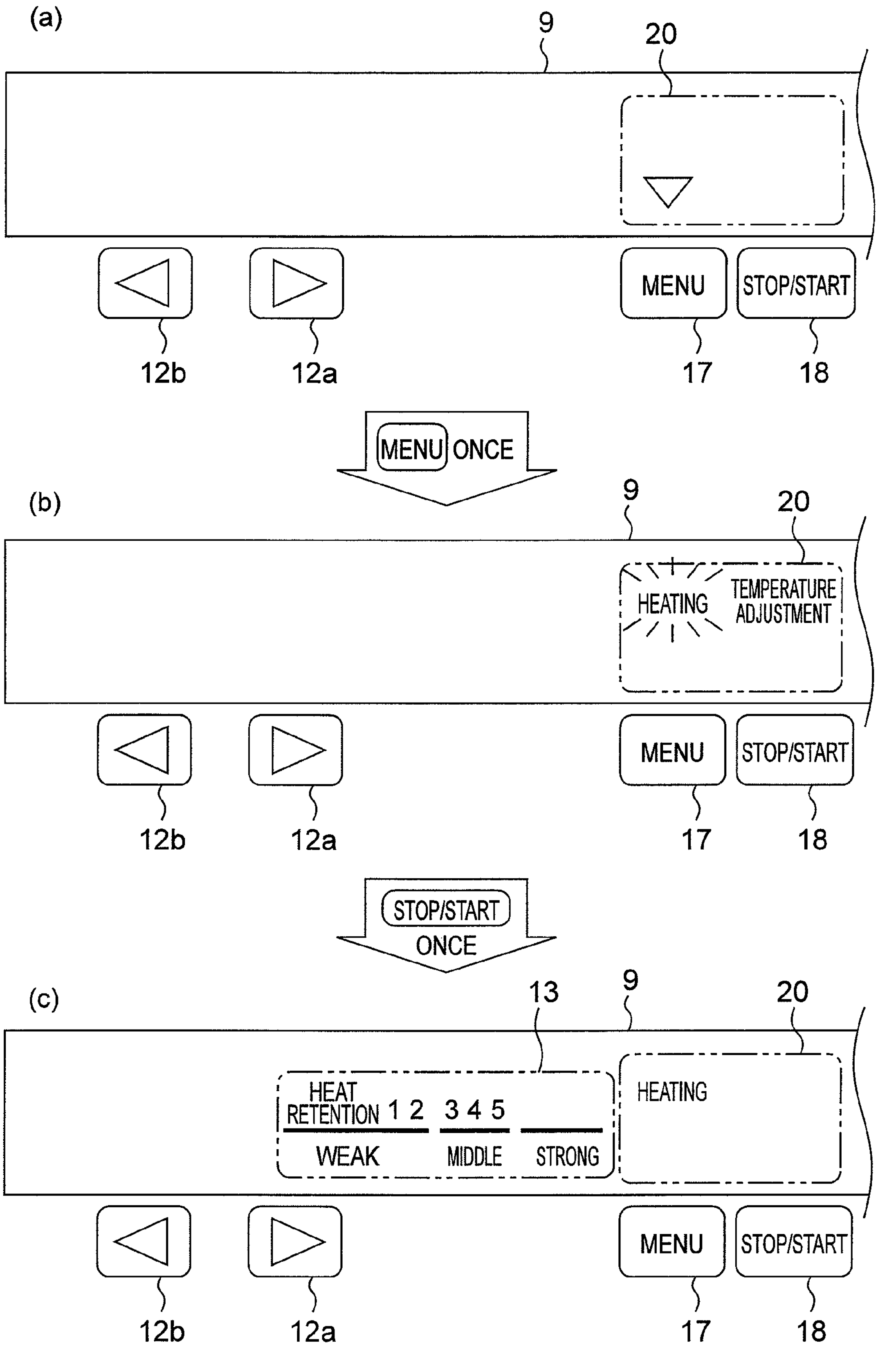
FIG. 15 is a display example of the display unit when selecting heating control by output adjustment according to the second embodiment of the present invention.

When the menu key 17 is operated once in the state of FIG. 15(*a*), the symbol "∇" in the menu display section 20 disappears, characters "heating" and "temperature adjustment" are displayed, and the characters "heating" are flashed on and off (FIG. 15(*b*)). The flashing means that it is being selected. When the stop/start key 18 is pushed in such a state, the heating is started at a predetermined output (e.g., output of 1 kW for the display "5") (FIG. 15(*c*)). In this case, only the characters "heating" are displayed in the menu display section 20 and the output display section 13 is displayed in the display unit 9. Thereafter, the heating output can be changed by the adjustment keys 12*a*, 12*b*, similar to the first embodiment. For example, the control unit 5 controls the heating coil 4 to increase the heating output every time the adjustment key 12*a* is pushed and to decrease the heating output every time the adjustment key 12*b* is pushed. The output display section 13 displays the magnitude of the heating output by illuminating up to the number corresponding to the heating output.

Figure 16:
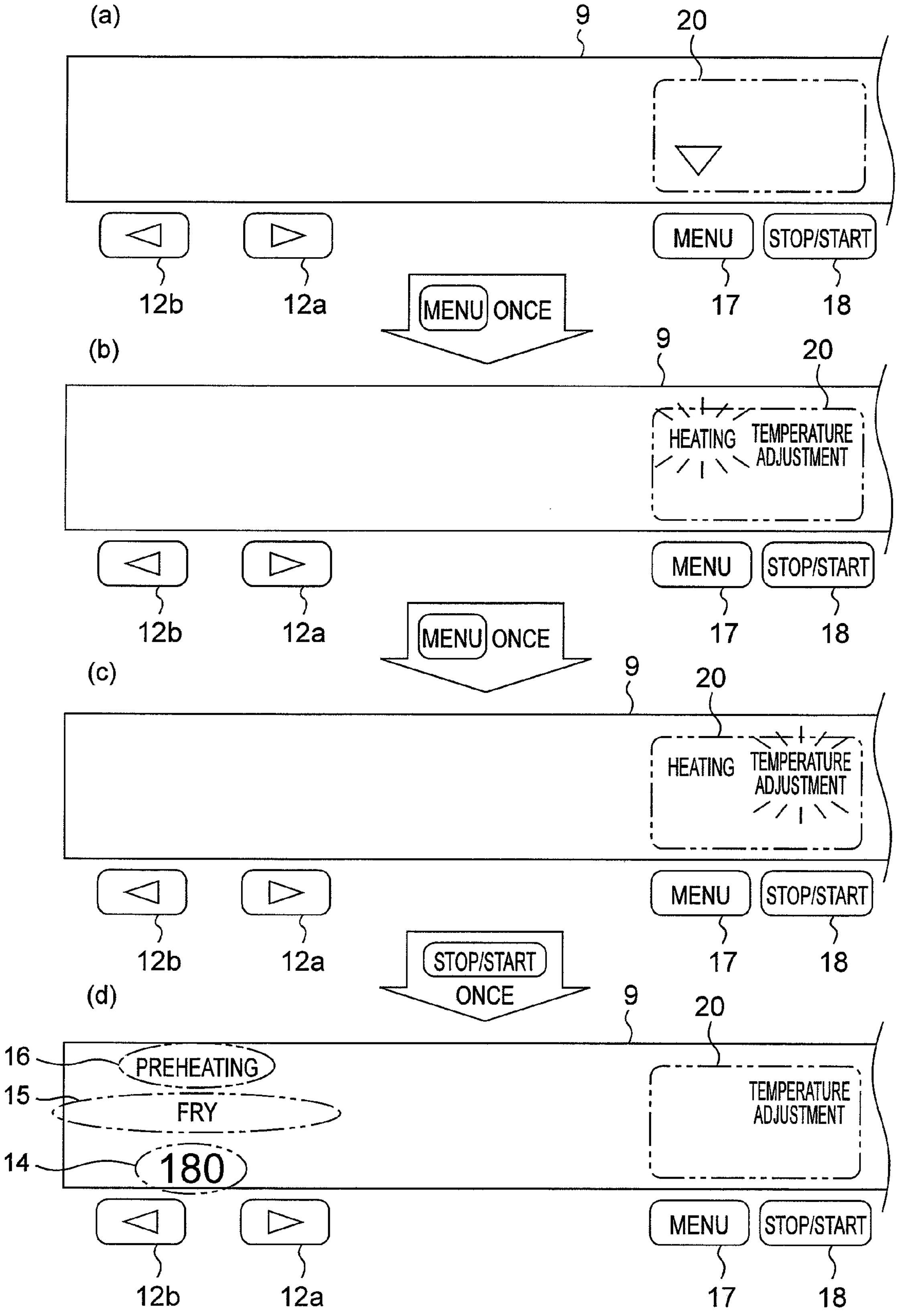
FIG. 16 is a display example of the display unit when selecting heating control by temperature adjustment according to the second embodiment of the present invention.

A case of performing the heating control by temperature adjustment (S1406) will be described with reference to FIG. 16. FIGS. 16(*a*) and 16(*b*) are the same as FIGS. 15(*a*) and 15(*b*). When the power switch is turned on (FIG. 16(*a*)) and the menu key 17 is operated once thereafter, the heating control by output adjustment is selected (FIG. 16(*b*)). When the menu key 17 is again operated in this state, the heating control by temperature adjustment is selected (FIG. 16(*c*)). The characters "heating" in the menu display section 20 change from a flashing state to an lighted-up state, and the characters "temperature adjustment" flash on and off. When the stop/start key 18 is operated in such a state, the heating control by temperature adjustment is started (FIG. 16(*d*)). In this case, the characters "heating" disappear and the characters "temperature adjustment" are lighted-up and displayed in the menu display section 20. The characters "180" indicating the default 180° C. are displayed in the temperature display section 14, and the characters "fry" indicating the default fry mode are displayed in the cooking mode display section 15. At the start of heating, the characters "preheating" are displayed in the preheating display section 16 since the temperature of the object to be heated has not reached the set temperature (e.g., 180° C.).

Figure 17:
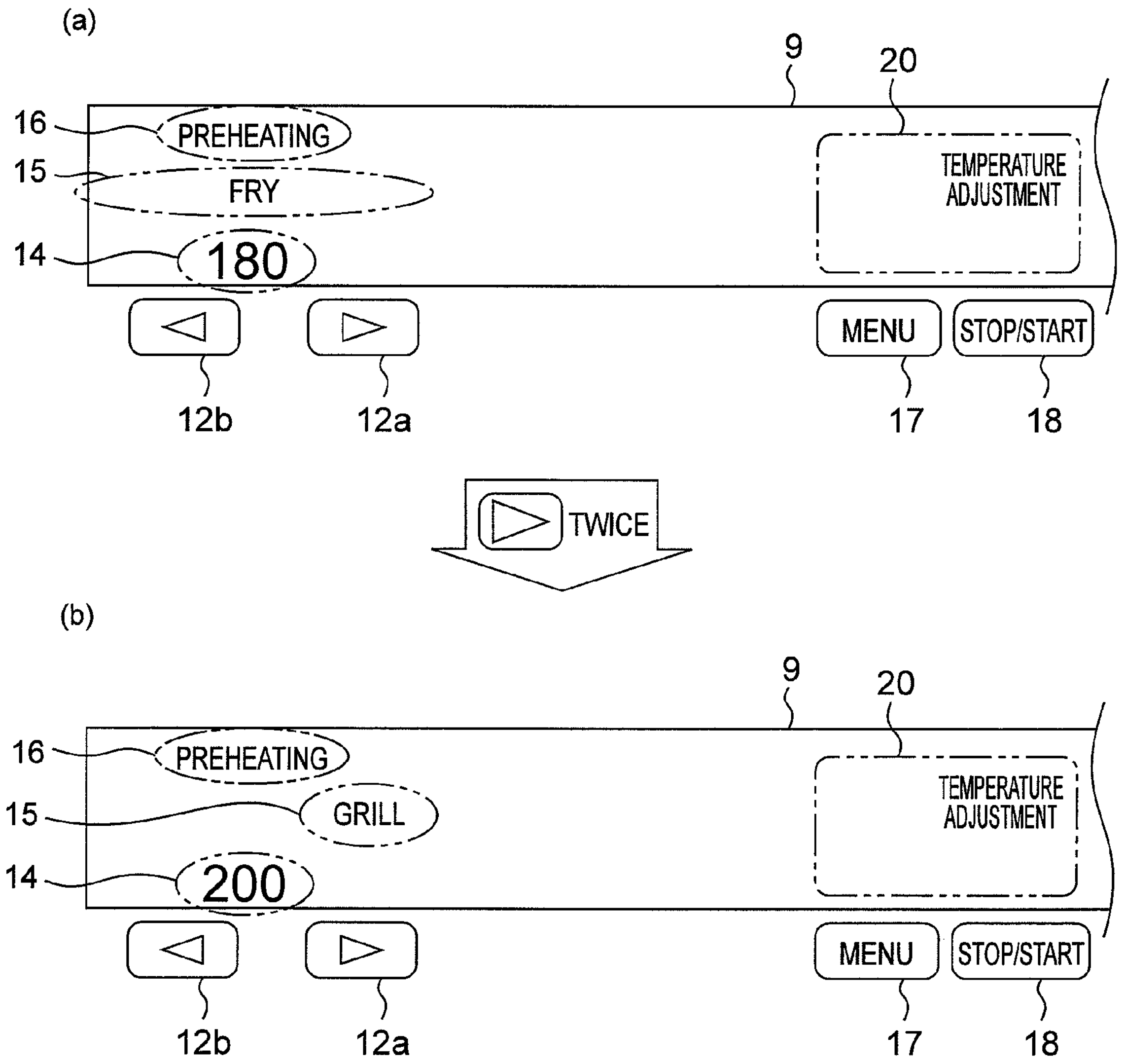
FIG. 17 is a display example of the display unit in the heating control by temperature adjustment according to the second embodiment of the present invention.

FIG. 17 shows a display example of the display unit 9 at the time of adjusting the heating temperature. FIG. 17(*a*) shows a default state where the heating control by temperature adjustment is started, and is the same as FIG. 16(*d*). After the heating control by temperature adjustment is started, the heating temperature can be changed by the adjustment keys 12*a*, 12*b*. For example, the set temperature changes from 180° C. to 200° C. when the adjustment key 19*a* is operated twice in the state of FIG. 18(*a*). In this case, the characters "200" indicating 200° C. are displayed in the temperature display section 14. The characters "grill" indicating the grill mode are displayed in the cooking mode display section 15 since 200° C. corresponds to the temperature of the grill mode, as shown in the first table of FIG. 5. The object 6 to be heated is heated so as to reach 200° C. in the grill mode.

Figure 18:
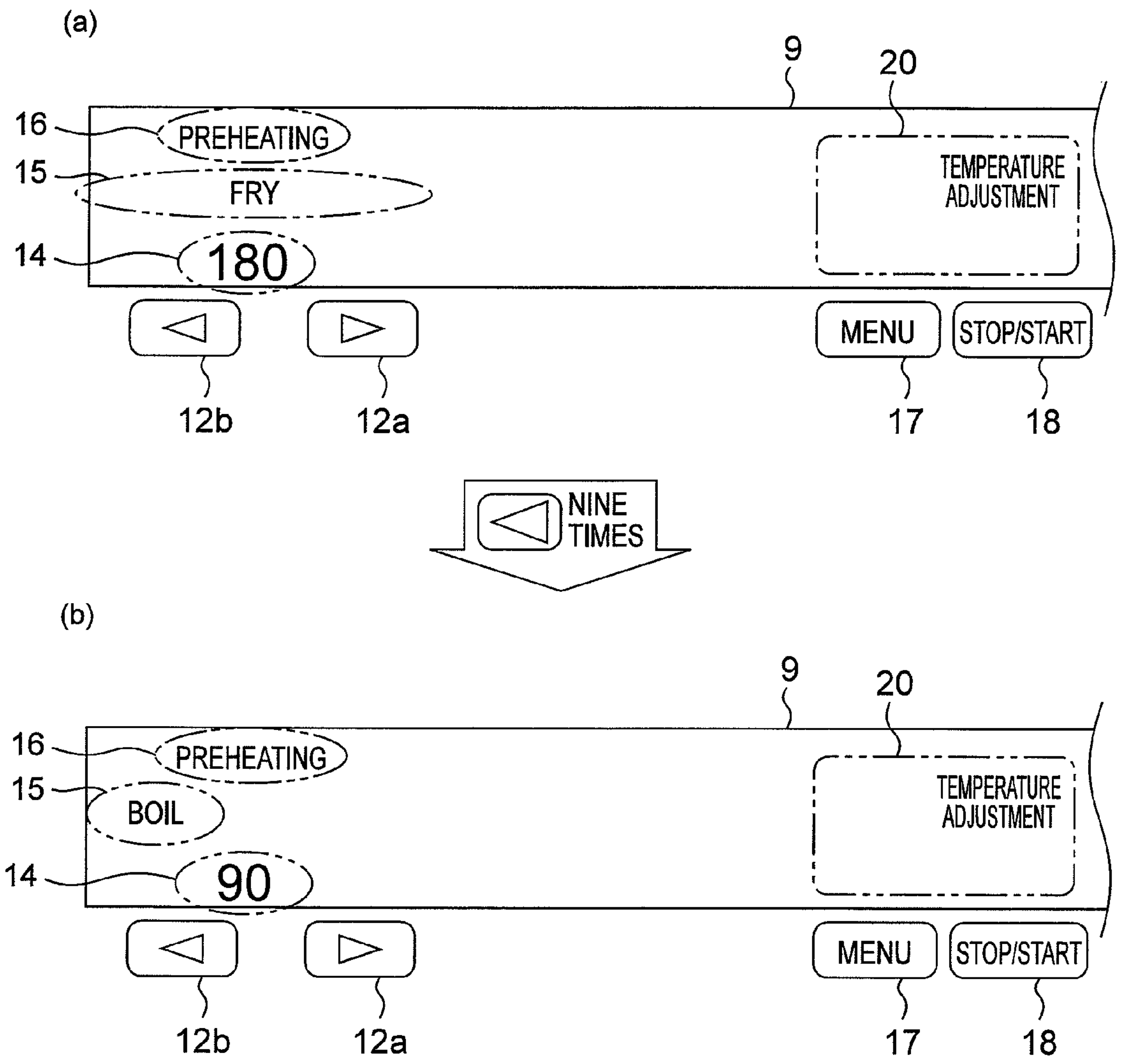
FIG. 18 is a display example of the display unit in the heating control by temperature adjustment according to the second embodiment of the present invention.

FIG. 18 further shows the display example of the display unit 9 at the time of adjusting the heating temperature. FIG. 18(*a*) shows a default state where the heating control by temperature adjustment is started, and is the same as FIG. 16(*d*). When the adjustment key 12*b* is operated nine times in the state of FIG. 18(*a*), the set temperature changes from 180° C. to 90° C. In this case, the characters "90" indicating 90° C. are displayed in the temperature display section 14. The characters "boil" indicating the boil mode are displayed in the cooking mode display section 15 since 90° C. corresponds to the temperature of the boil mode, as shown in the first table of FIG. 5. The object 6 to be heated is heated so as to reach 90° C. in the boil mode.

As described above, the present embodiment has the same effects as the first embodiment since the cooking mode is automatically selected according to the set temperature, similar to the first embodiment.

Similar to variant 1 of the first embodiment, the cooking mode may be fixed at a predetermined timing. For example, the cooking mode may be fixed after the stop/start key 18 is operated and three minutes have elapsed from the start of the heating control by temperature adjustment. The setting range of the heating temperature based on the cooking mode may be limited according to the second table shown in FIG. 9 after the cooking mode is fixed.

Similar to variant 2 of the first embodiment, the cooking mode may be manually set. For example, the cooking mode may be manually set by pushing the menu key 17 long.

Third Embodiment

A cooking device according to a third embodiment of the present invention will be described with reference to FIGS. 19 to 26.

3.1 Configuration of Cooking Device

Figure 19:
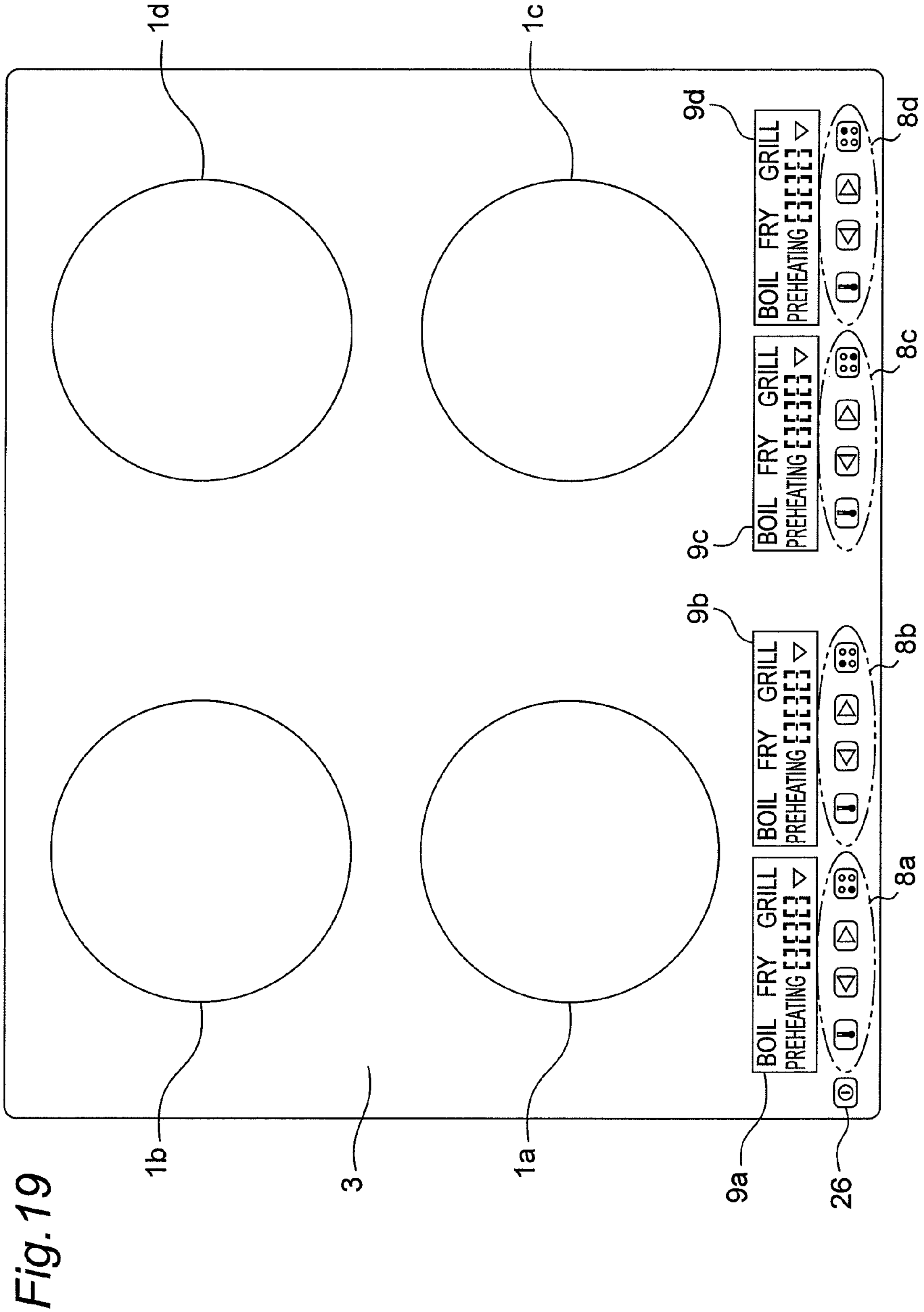
FIG. 19 is a plan view showing a configuration of a cooking device according to a third embodiment of the present invention.

FIG. 19 shows a configuration of the cooking device according to the present embodiment. In FIG. 19, the same reference numerals denote the same components as in FIG. 2, and the detailed description thereof will not be given. The cooking device according to the third embodiment differs from the cooking device according to the first embodiment in the configuration of a part of the operation unit and a part of the display unit. In other aspects, the third embodiment is the same as the first embodiment. In other words, the cooking mode is automatically set based on the first table shown in FIG. 5 until the cooking mode is fixed, and the setting range of the heating temperature is limited according to the cooking mode based on the second table shown in FIG. 9 when the cooking mode is fixed.

The cooking device of the present embodiment includes four heating coils (not shown). Four operation units 8*a*, 8*b*, 8*c*, 8*d*, four display units 9*a*, 9*b*, 9*c*, 9*d*, four mounting units 1*a*, 1*b*, 1*c*, 1*d*, four temperature sensors (not shown), and four control units (not shown) are provided in accordance with the number of heating coils. Such elements provided by fours respectively have the same configuration. One of the elements will be representatively described below.

Figure 20:
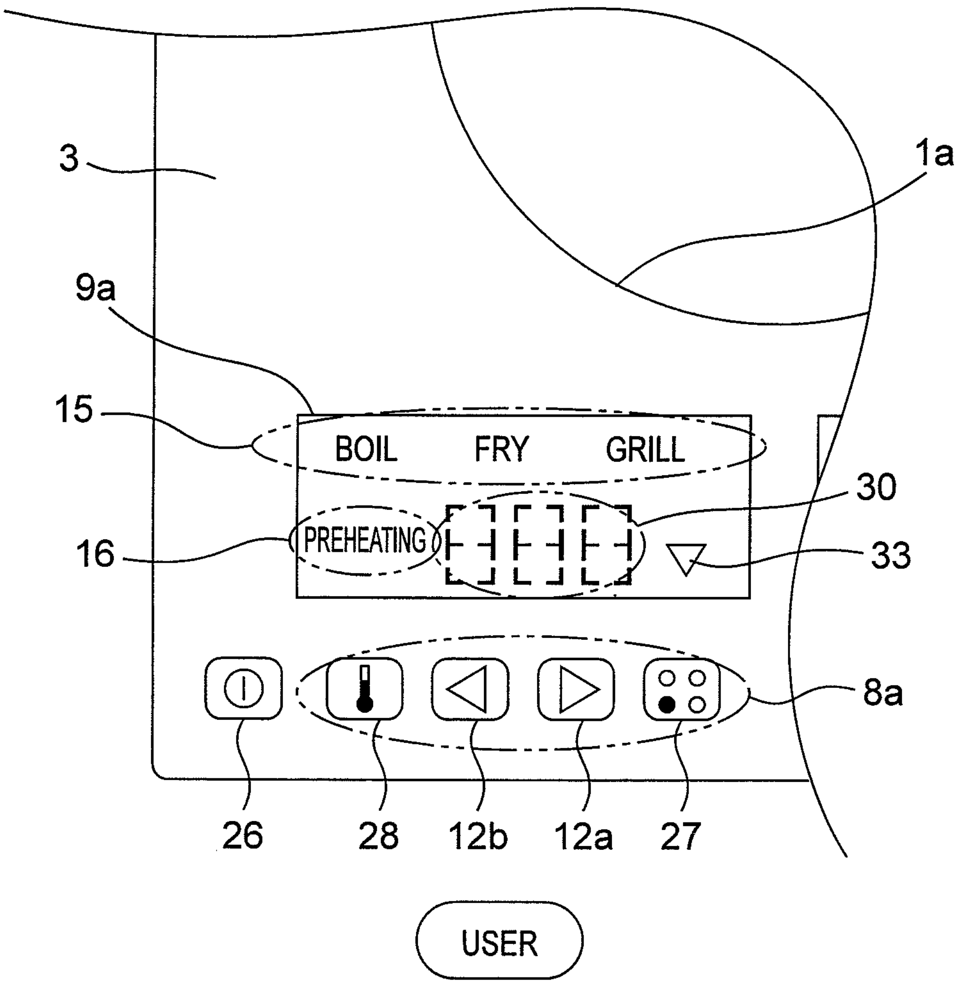
FIG. 20 is an enlarged view of a part of the configuration of the cooking device according to the third embodiment of the present invention.

FIG. 20 shows a part of the top plate 3. A power switch key 26 is provided on the left near side (user side) of the top plate 3.

The operation unit 8*a* includes a heating key 27 assigned with the function of starting and stopping heating, a temperature adjustment key 28 for starting temperature adjustment, and the adjustment keys 12*a*, 12*b* for increasing and decreasing the set values of the heating output and the heating temperature. In the present embodiment, only the function of starting temperature adjustment is assigned to the temperature adjustment key 28, and the function of starting and stopping heating is not assigned to the temperature adjustment key 28. The function of starting and stopping heating by both output adjustment and temperature adjustment is assigned to the heating key 27.

In the first embodiment, the heating by output adjustment is started at the default heating output when the heating key 10 is operated once after the power is turned on. In contrast, in the present embodiment, by setting the default value to 0 kW, the heating by output adjustment does not start by merely operating the heating key 27 once. Further, in the first embodiment, the heating by temperature adjustment is started at the default set temperature when the temperature adjustment key 11 is operated once. In contrast, in the present embodiment, the heating does not start even if the temperature adjustment key 28 is operated, and the heating is started when the heating key 27 is operated after the temperature adjustment key 28 is operated. Thus, in the present embodiment, the heating does not start with only one key operation in both output adjustment and temperature adjustment, thereby enhancing safety.

The display unit 9*a* includes a set output temperature display section 30 for displaying the output value at the time of heating control by output adjustment and the set temperature at the time of heating control by temperature adjustment, an operable display section 33 for displaying the symbol "∇" for inducing the operation of the heating key 27, the cooking mode display section 15, and the preheating display section 16. In FIG. 20, a state in which each display in the display unit 9*a* are displayed is shown in order to clarify the content displayable in the display unit 9*a*, which is different from the actual display at the time of normal use.

3.2 Operation of Cooking Device

Figure 21:
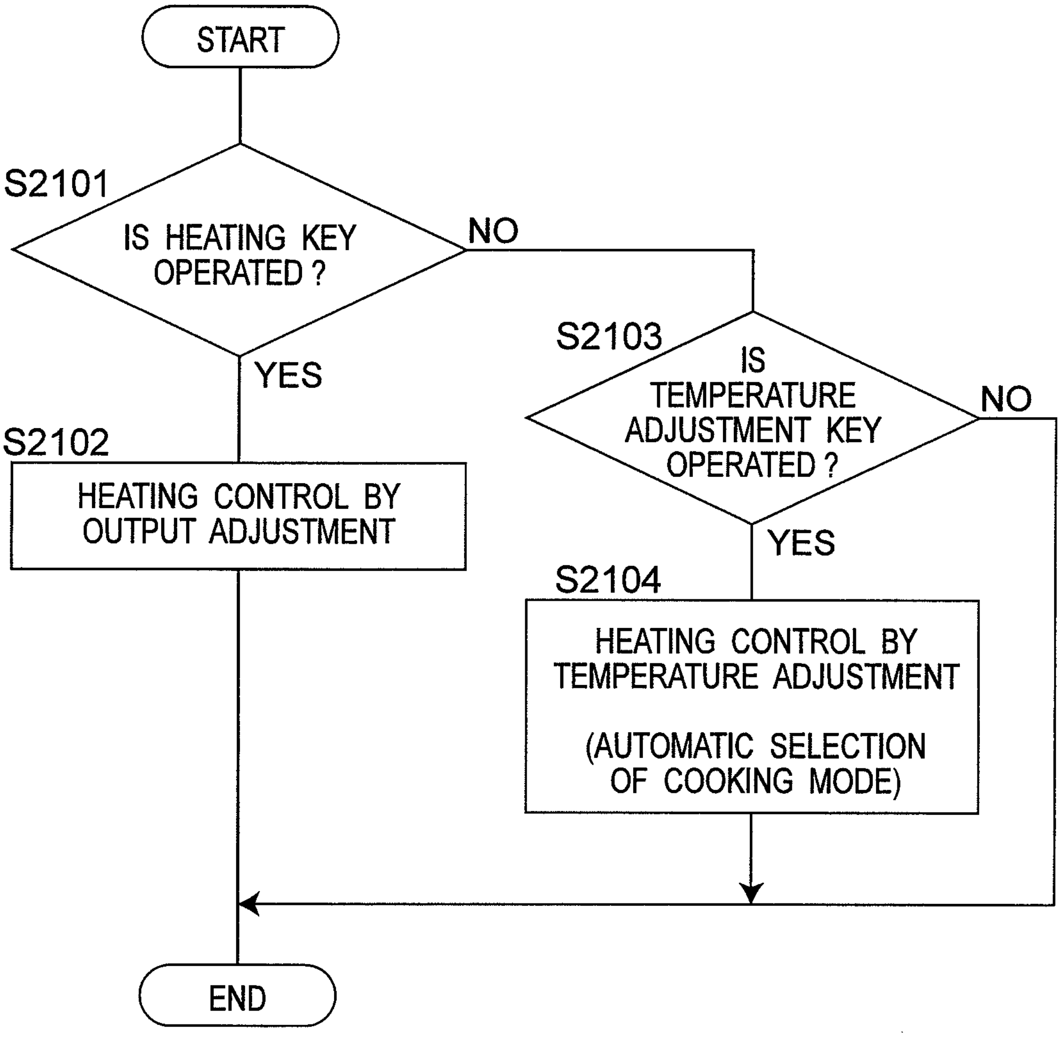
FIG. 21 is a flowchart showing a schematic operation of the cooking device according to the third embodiment of the present invention.

The schematic operation of the cooking device of the present embodiment configured as above is shown in FIG. 21. After the power switch key 26 of the cooking device is operated and the power is turned on, the control unit 5 determines whether or not the heating key 27 is operated (S2101). If the heating key 27 is operated (Yes at S2101), the control unit 5 controls the heating coil 4 to perform heating control by output adjustment (W) (S2102). If the heating key 27 is not operated (No at S2101), the control unit 5 determines whether or not the temperature adjustment key 28 is operated (S2103). If the temperature adjustment key 28 is operated (Yes at S2103), the control unit 5 controls the heating coil 4 to perform heating control by temperature adjustment (° C.) (S2104). In the heating control by temperature adjustment, the control unit 5 automatically selects the cooking mode based on the set temperature.

Figure 22:
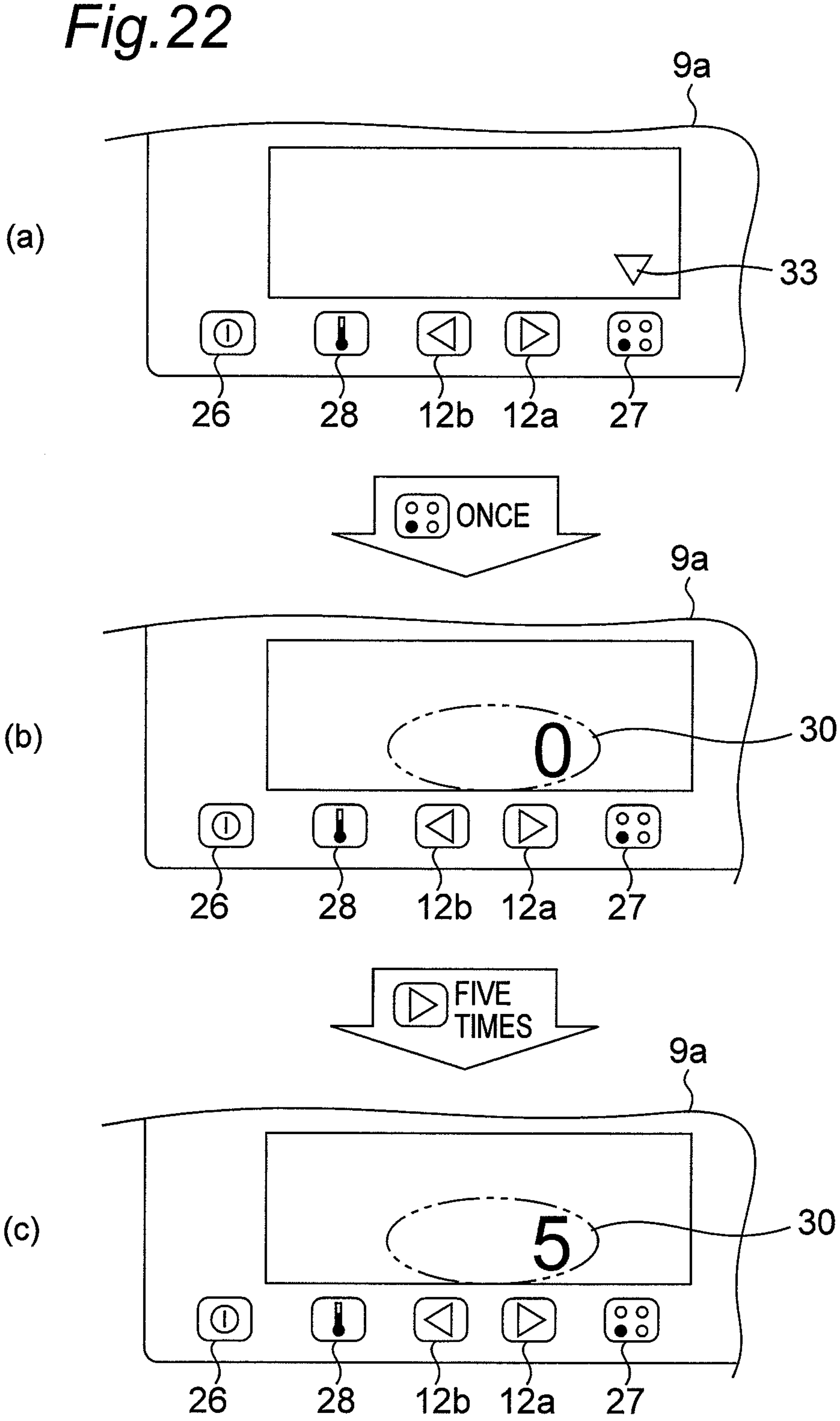
FIG. 22 is a display example of the display unit in the heating control by output adjustment according to the third embodiment of the present invention.

The heating control by output adjustment (S2102) will be described with reference to FIG. 22. FIG. 22 shows the display of the display unit 9*a* at the time of heating control by output adjustment. When the power switch 26 is turned on by the user, the control unit 5 sets only the operable display section 33 to be in the displayed state in the display unit 9*a*, and induces the operation of the heating key 27 (FIG. 22(*a*)). When the heating key is operated, the number "0" is displayed in the set output temperature display section 30 (FIG. 23(*b*)). The object to be heated is not heated at this point since the heating output is 0 kW.

The heating output can be changed by the adjustment keys 12*a*, 12*b*. The control unit 5 controls the heating coil 4 to increase the heating output by one every time the adjustment key 12*a* is pushed and to decrease the heating output by one every time the adjustment key 12*b* is pushed. The set output temperature display section 30 displays the number corresponding to the heating output. For example, when the adjustment key 12*a* is pushed five times by the user, the number "5" is displayed in the set output temperature display section 30 (FIG. 23(*c*)). The heating output in this case corresponds to 1 kW. The object to be heated is heated at the heating output of 1 kW.

Figure 23:
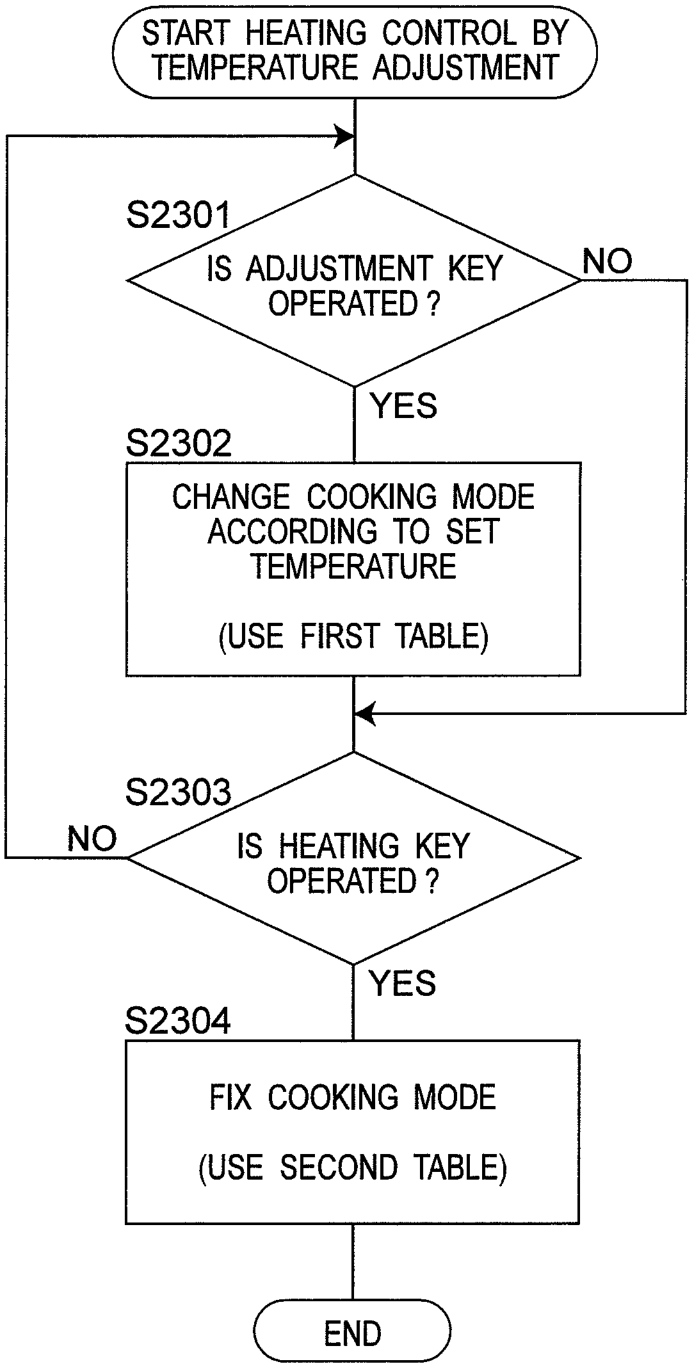
FIG. 23 is a flowchart in the heating control by temperature adjustment according to the third embodiment of the present invention.

The heating control by temperature adjustment (S2104) will be described with reference to FIGS. 23 to 26. FIG. 23 shows a control flow of the heating control by temperature adjustment. When the temperature adjustment key 28 is operated and the heating control by temperature adjustment is started after the power is turned on, the control unit 5 enables the changing function of the temperature adjustment by the adjustment keys 12*a*, 12*b*. The control unit 5 determines whether or not the adjustment keys 12*a*, 12*b* are operated (S2301). When the adjustment keys 12*a*, 12*b* are operated, the control unit 5 automatically sets the cooking mode according to the set heating temperature (S2302). In this case, the first table shown in FIG. 5 is used.

The control unit 5 determines whether or not the heating key 27 is operated (S2303). If the heating key 27 is operated, the control unit 5 sets the cooking mode set at the time to be unchangeable (S2304). The control unit 5 limits the settable range of the heating temperature according to the set cooking mode based on the second table shown in FIG. 9 after fixing the cooking mode.

Figure 24:
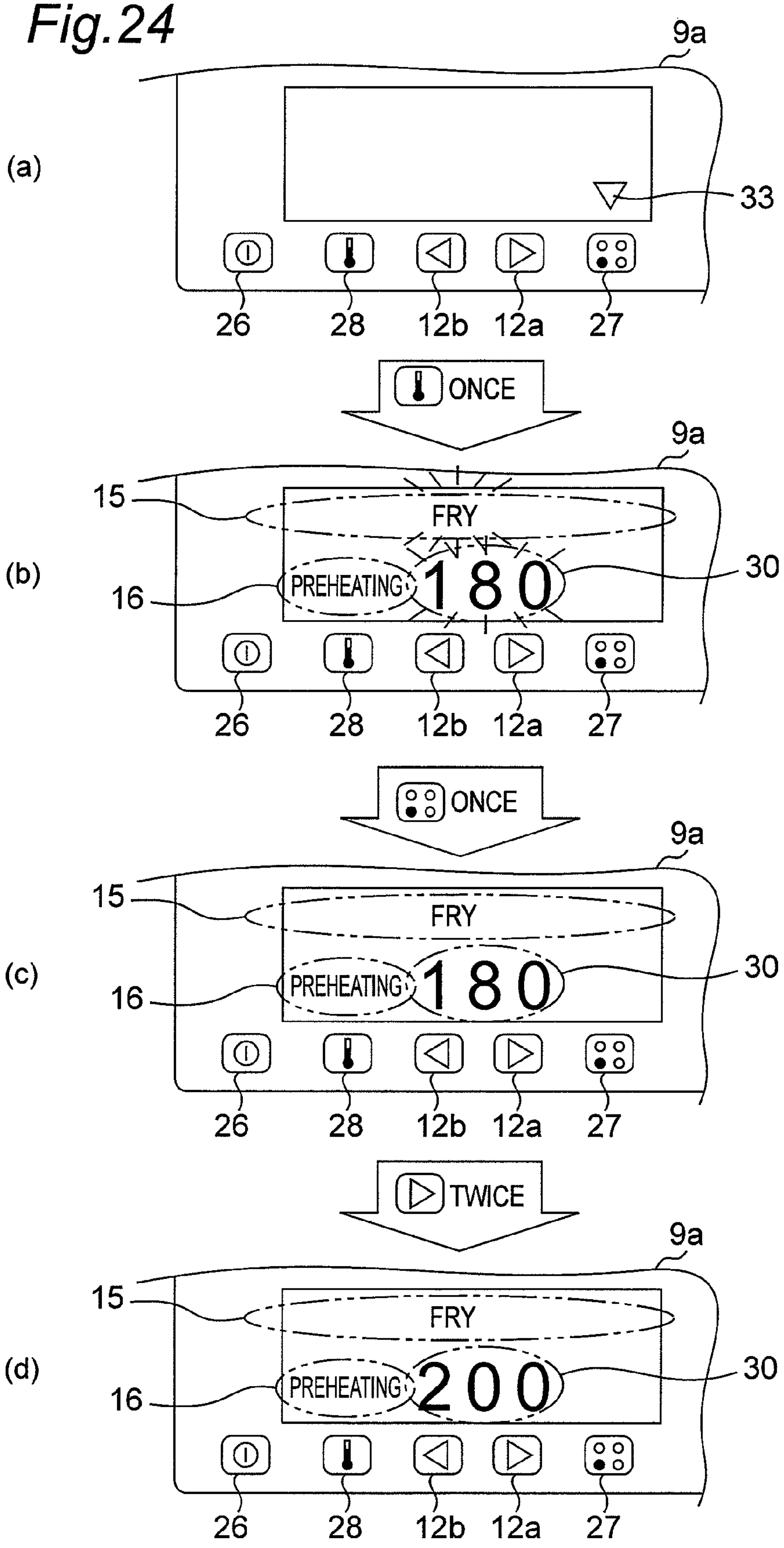
FIG. 24 is a display example of the display unit in the heating control by temperature adjustment according to the third embodiment of the present invention.

FIG. 24 shows an example of selecting 180° C. and starting heating. When the power switch 26 is operated to turn on the power, the control unit 5 sets the operable display section 33 to be displayed. The symbol "∇" inducing the operation of the heating key 27 is thereby displayed (FIG. 24(*a*)). When the temperature adjustment key 28 is operated by the user in such a state, the control unit 5 controls the cooking device to enable temperature adjustment. Specifically, the characters "180" indicating 180° C., which is a default value, are displayed in the set output temperature display section 30 in the flashing state. The characters "fry" indicating the fry mode corresponding to 180° C. are displayed in the cooking mode display section 15 in the flashing state, and the characters "preheating" are displayed in the preheating display section 16 (FIG. 24(*b*)). The heating is not yet started in this state.

When the heating key 27 is operated in the state of FIG. 24(*b*), the cooking mode is fixed, and the heating is started. In this case, the characters "180" indicating 180° C. in the set output temperature display section 30 change from the flashing state to the lighted-up state, and the characters "fry" indicating the fry mode in the cooking mode display section 15 change from the flashing state to the lighted-up state (FIG. 24(*c*)). The setting range of the heating temperature is limited based on the second table after the cooking mode is fixed. For example, when the adjustment key 12*a* is operated twice, the control unit 5 changes the set temperature to be 200° C., and the characters "200" indicating 200° C. are lighted-up in the set output temperature display section 16 (FIG. 24(*d*)).

Figure 25:
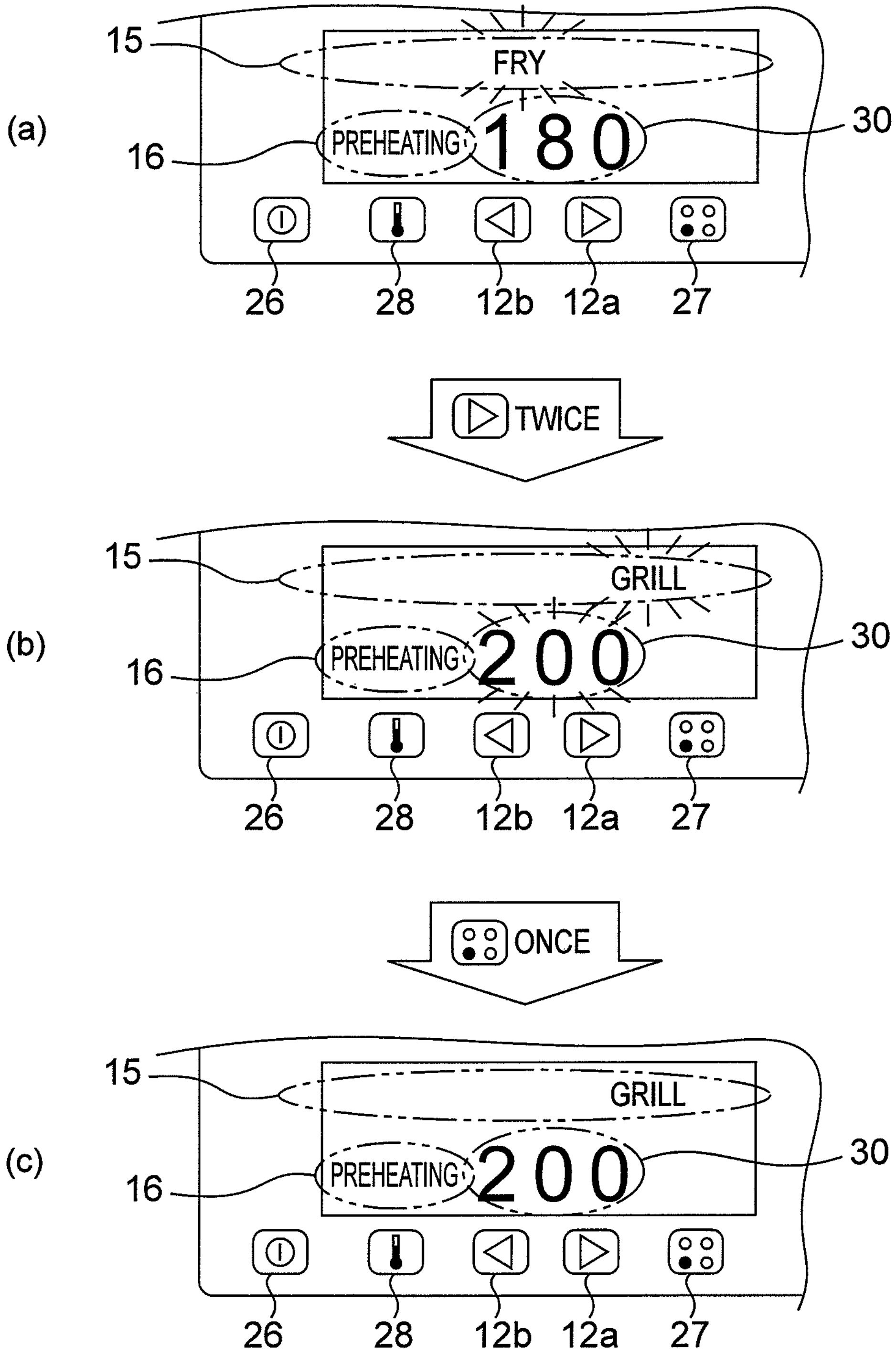
FIG. 25 is a display example of the display unit in the heating control by temperature adjustment according to the third embodiment of the present invention.

FIG. 25 shows an example of selecting 200° C. and starting heating. When the temperature adjustment key 28 is operated after the power switch key 26 is operated, and the adjustment key 12*a* is operated twice with 180° C. as a default value set (FIG. 25(*a*)), the control unit 5 changes the set temperature to be 200° C. (FIG. 25(*b*)). The characters "200" indicating 200° C. are displayed in the set output temperature display section 30 in the flashing state. The control unit 5 sets the cooking mode to the grill mode since 200° C. corresponds to the grill mode, as shown in the first table. The characters "grill" indicating the grilled food are displayed in the cooking mode display section 15 in the flashing state. At this point, the heating is not yet started. When the heating key 27 is thereafter operated, the cooking mode is fixed to the grill mode, and the heating actually is started. The characters "200" of the set output temperature display section 30 change from the flashing state to the lighted-up state, and the characters "grill" of the cooking mode display section 15 change from the flashing state to the lighted-up state (FIG. 25(*c*)).

Figure 26:
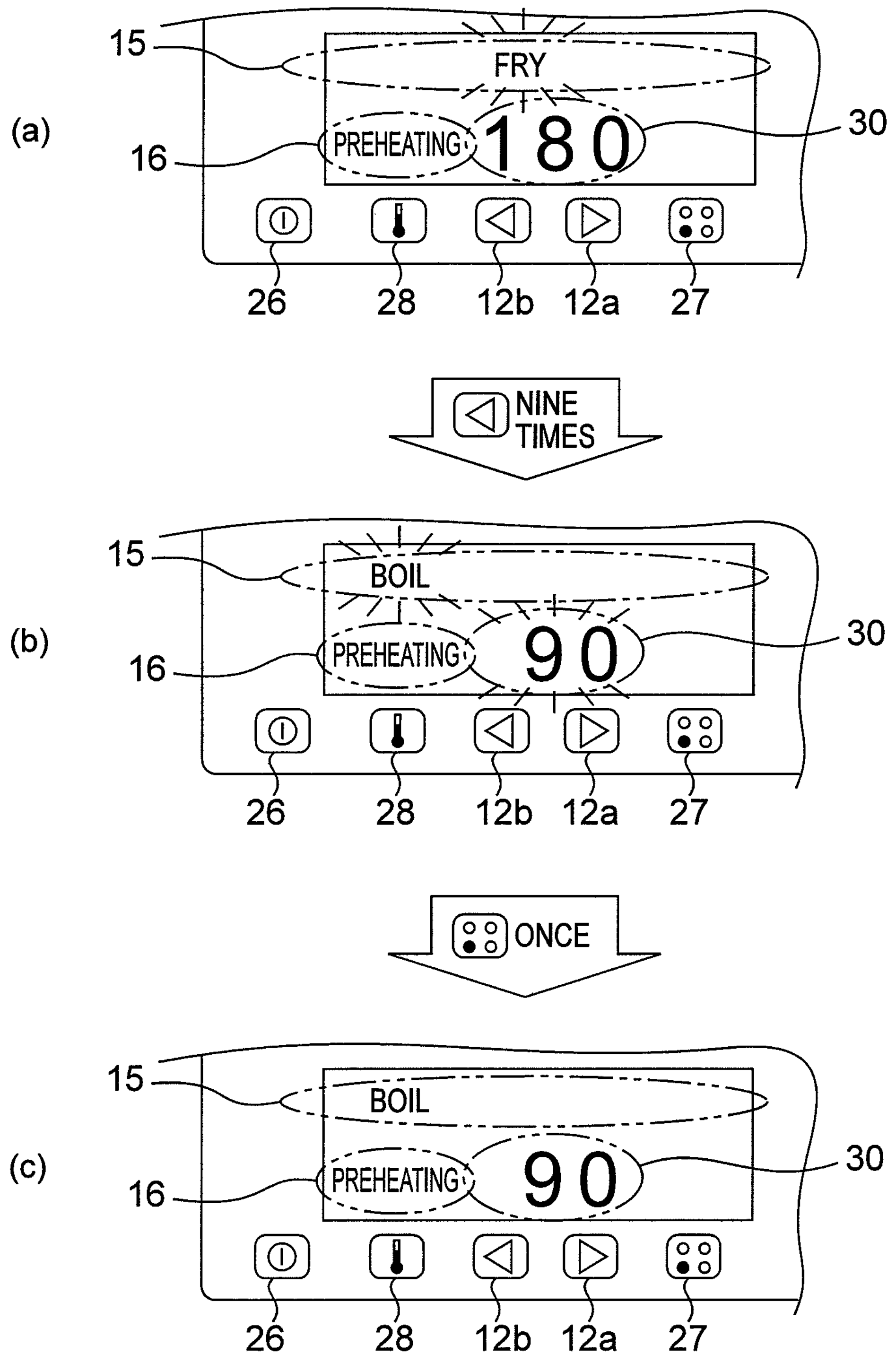
FIG. 26 is a display example of the display unit in the heating control by temperature adjustment according to the third embodiment of the present invention.

FIG. 26 shows an example of selecting 90° C. and starting heating. When the temperature adjustment key 28 is operated after the power switch key 26 is operated, and the adjustment key 12*b* is operated nine times with 180° C. as a default value set (FIG. 26(*a*)), the control unit 5 changes the set temperature to 90° C. (FIG. 26(*b*)). The characters "90" indicating 90° C. are displayed in the set output temperature display section 30. The control unit 5 sets the cooking mode to the boil mode since 90° C. corresponds to the boil mode, as shown in the first table. The characters "boil" indicating the boil mode are displayed in the cooking mode display section 15 in the flashing state. At this point, the heating is not yet started. When the heating key 27 is thereafter operated, the cooking mode is fixed to the boil mode, and the heating actually is started. The characters "90" of the set output temperature display section 30 change from the flashing state to the lighted-up state, and the characters "boil" of the cooking mode display section 15 change from the flashing state to the lighted-up state (FIG. 26(*c*)).

Therefore, the present embodiment has the same effects as the first embodiment since the cooking mode is automatically set according to the set temperature, similar to the first embodiment.

Furthermore, according to the present embodiment, areas of the display units 9*a* to 9*d* can be reduced since the display of the set output at the time of heating by output adjustment and the display of the set temperature at the time of heating by temperature adjustment are carried out with one set output temperature display section 30.

In the first to the third embodiment, the cooking device has been described by using an example of the induction cooking device, but the type of cooking device is not limited to the example of the first to the third embodiments. For example, the cooking device may be a device which heats an object to be heated using an electrical heater or gas.

In the first to the third embodiments, a liquid crystal display is used for the display unit, but the display unit are not limited to the liquid crystal display. The set temperature, the type of cooking mode, and the like merely need to be displayed on the display unit, and an LED may be used for the display unit.

In the first to the third embodiments, the touch key in which electrostatic capacitance is used for the operation unit is used, but the type of operation unit is not limited to the touch key. The key merely needs to be able to set the heating output and the heating temperature, and may be a membrane type touch key, a touch key by piezoelectric element, or a rotational switch such as a rotary.

The correspondence relationship of the heating temperature and the cooking mode in the first table shown in FIG. 5 and the second table shown in FIG. 9 is merely an example. The correspondence relationship of the heating temperature and the cooking mode may be changed. The number of set values of the heating temperature, the type of cooking mode, and the like are also not limited to those of the first to the third embodiments.

The default value in the first to the third embodiments is merely an example. Therefore, the default value by temperature adjustment may be set to a temperature other than 180° C.

An example of manually selecting the cooking mode by pushing the temperature adjustment key 11 long has been described in the first embodiment, but a mode selection switch for enabling the cooking mode such as the grill mode, the fry mode, and the boil mode to be manually selected may be further provided in the first to the third embodiments in addition to the temperature adjustment key 11.

Although the present invention has been described in connection with specified embodiments thereof, many other modifications, corrections and applications are apparent to those skilled in the art. Therefore, the present invention is not limited by the disclosure provided herein but limited only to the scope of the appended claims.

INDUSTRIAL APPLICABILITY

The cooking device of the present invention has an effect of easily performing heating setting when performing heating control by temperature adjustment, and is useful for a general cooking device for performing the heating control by temperature adjustment.

The invention claimed is:

1. A cooking device which includes a plurality of cooking modes suited for various cooking and is capable of heating an object to be heated with a control method corresponding to each of the cooking modes, the cooking device comprising:

a heating unit operable to heat the object to be heated;

an operation unit including a temperature setting switch for setting a heating temperature;

a temperature sensor operable to detect a temperature of the object to be heated; and a control unit operable to control the heating unit so that the temperature detected by the temperature sensor is equal to a set temperature set by using the temperature setting switch, wherein the control unit automatically selects the cooking mode based on the set temperature set by using the temperature setting switch.

2. The cooking device according to claim 1, wherein the control unit disables changing of the selected cooking mode at a predetermined timing after the cooking mode is automatically selected based on the set temperature.

3. The cooking device according to claim 2, wherein the predetermined timing is when a predetermined time has elapsed after automatically selecting the cooking mode.

4. The cooking device according to claim 2, wherein:

the operation unit further includes a heating start switch for starting heating of the object to be heated; and the predetermined timing is when the heating start switch is operated.

5. The cooking device according to claim 2, wherein:

the control unit limits a range of the heating temperature settable by the temperature setting switch to within a predetermined range according to the selected cooking mode after disabling changing of the cooking mode; and the predetermined range is wider than a heating temperature range assigned to each of the cooking modes when the cooking mode is automatically selected.

6. The cooking device according to claim 1, wherein:

the operation unit further includes a plurality of switches; and the control unit assigns a function of setting the cooking mode to one of the switches of the operation unit when a predetermined switch of the operation unit is operated for a predetermined time or longer.

* * * * *